(12) United States Patent
Nussbaum

(10) Patent No.: US 12,144,397 B2
(45) Date of Patent: Nov. 19, 2024

(54) LACE ADJUSTER ASSEMBLY INCLUDING FEEDBACK ASSEMBLY FOR USE IN VISUALIZING AND MEASURING ATHLETIC PERFORMANCE

(71) Applicant: LACECLIP LLC, Miami, FL (US)

(72) Inventor: Jonathan Nussbaum, Miami, FL (US)

(73) Assignee: LACECLIP LLC, Miami, FL (US)

( * ) Notice: Subject to any disclaimer, the term of this patent is extended or adjusted under 35 U.S.C. 154(b) by 0 days.

(21) Appl. No.: 18/110,817

(22) Filed: Feb. 16, 2023

(65) Prior Publication Data

US 2023/0189917 A1  Jun. 22, 2023

Related U.S. Application Data

(63) Continuation of application No. 16/690,908, filed on Nov. 21, 2019, now Pat. No. 11,659,885, which is a continuation of application No. 15/301,946, filed as application No. PCT/US2015/025763 on Apr. 14, 2015, now Pat. No. 10,595,581.

(60) Provisional application No. 62/043,822, filed on Aug. 29, 2014, provisional application No. 62/018,194, filed on Jun. 27, 2014.

(51) Int. Cl.
*A43B 3/34* (2022.01)
*A43C 1/06* (2006.01)
(Continued)

(52) U.S. Cl.
CPC .................. *A43B 3/34* (2022.01); *A43C 1/06* (2013.01); *A43C 7/00* (2013.01); *A43C 7/08* (2013.01);
(Continued)

(58) Field of Classification Search
CPC .... A43C 1/06; A43C 7/00; A43C 7/08; A43B 3/0005; A43B 3/34; Y10T 24/3708;
(Continued)

(56) References Cited

U.S. PATENT DOCUMENTS 1,879,475 A   9/1932  Poon
4,622,723 A   11/1986 Krauss
(Continued)

FOREIGN PATENT DOCUMENTS

CN   101185535 A1   5/2008
CN   101367011 A    2/2009
(Continued)

OTHER PUBLICATIONS

Office Action issued by the U.S. Patent Office in U.S. Appl. No. 16/690,908 dated Feb. 21, 2023. Reference available in Parent/Continuation U.S. Appl. No. 16/690,908.

(Continued)

*Primary Examiner* — Christine M Mills
*Assistant Examiner* — Matthew J Sullivan
(74) *Attorney, Agent, or Firm* — ROEDER & BRODER LLP; Steven G. Roeder

(57) ABSTRACT

A lace adjuster assembly (12) is adapted to selectively adjust a shoelace (11) of a shoe (10) of a user. The lace adjuster assembly (12) comprises a lace adjuster (14) and a feedback assembly (19). The lace adjuster (14) is adapted to selectively adjust the shoelace (11) of the shoe (10) of the user. The feedback assembly (19) is coupled to the lace adjuster (14). Additionally, the feedback assembly (19) is configured to perform one of (i) selectively measuring statistical data of the user during an athletic performance, and (ii) selectively capturing an image of the user during the athletic performance.

20 Claims, 13 Drawing Sheets

(51) Int. Cl.
  *A43C 7/00* (2006.01)
  *A43C 7/08* (2006.01)
  *A45F 5/02* (2006.01)
  *G01P 15/18* (2013.01)
  *G03B 29/00* (2021.01)

(52) U.S. Cl.
  CPC ............... *A45F 5/02* (2013.01); *G01P 15/18* (2013.01); *G03B 29/00* (2013.01); *A45F 2005/023* (2013.01)

(58) Field of Classification Search
  CPC .. Y10T 24/3713; A45F 5/02; A45F 2005/023; G01P 15/18; G03B 29/00
  See application file for complete search history.

(56) References Cited

U.S. PATENT DOCUMENTS

| | | | |
|---|---|---|---|
| 5,029,371 A | 7/1991 | Rosenblood | |
| 5,345,657 A | 9/1994 | Shimizu | |
| 5,649,340 A | 7/1997 | Ida | |
| 7,063,647 B2* | 6/2006 | Harney | A63B 22/025 482/4 |
| 7,255,468 B2* | 8/2007 | Capriola | A43C 1/00 36/137 |
| 7,404,263 B2* | 7/2008 | Guzman | A43B 5/02 36/137 |
| 7,596,891 B2* | 10/2009 | Carnes | A43B 3/34 36/25 R |
| 7,722,219 B2* | 5/2010 | Hartley | A43C 7/00 362/253 |
| 7,788,828 B2* | 9/2010 | Krouse | A43C 15/14 36/134 |
| 8,181,320 B2 | 5/2012 | Wolfberg | |
| 8,231,506 B2* | 7/2012 | Molyneux | A43B 1/0054 482/901 |
| 8,360,904 B2* | 1/2013 | Oleson | A61B 5/1118 482/8 |
| D689,495 S | 9/2013 | Bentley et al. | |
| D694,842 S | 12/2013 | Bentley et al. | |
| 8,613,676 B2 | 12/2013 | Bentley | |
| 8,628,453 B2* | 1/2014 | Balakrishnan | H04N 23/65 482/901 |
| 8,700,354 B1 | 4/2014 | Bentley et al. | |
| 8,702,430 B2* | 4/2014 | Dibenedetto | G01S 19/19 434/258 |
| 8,702,516 B2 | 4/2014 | Bentley et al. | |
| D706,654 S | 6/2014 | Bentley et al. | |
| 8,827,824 B2 | 9/2014 | Bentley et al. | |
| 8,888,346 B2* | 11/2014 | Tseng | A43B 3/38 362/570 |
| 8,903,521 B2 | 12/2014 | Goree et al. | |
| 8,904,605 B2 | 12/2014 | Kawaguchi | |
| 8,905,855 B2 | 12/2014 | Fitzpatrick et al. | |
| 8,913,134 B2 | 12/2014 | Goree et al. | |
| 8,941,723 B2 | 1/2015 | Bentley et al. | |
| 8,944,928 B2 | 2/2015 | Kaps et al. | |
| 8,994,826 B2 | 3/2015 | Bentley | |
| 8,997,314 B2* | 4/2015 | Kawaguchi | F16G 11/101 24/115 G |
| 9,017,296 B2 | 4/2015 | Beck | |
| 9,028,337 B2 | 5/2015 | Bentley | |
| 9,039,527 B2 | 5/2015 | Bentley et al. | |
| 9,523,704 B2* | 12/2016 | Balakrishnan | A63B 24/0021 |
| 9,578,926 B2* | 2/2017 | Alt | A43C 11/165 |
| 9,642,415 B2 | 5/2017 | Pease | |
| 9,737,115 B2* | 8/2017 | Soderberg | A43C 1/06 |
| 9,928,878 B2* | 3/2018 | Anderson | G11B 27/031 |
| 10,238,166 B2* | 3/2019 | Rosenbaum | A61B 5/6825 |
| 10,263,168 B2* | 4/2019 | Schneider | A43B 3/38 |
| 10,409,961 B2* | 9/2019 | Flaherty | G16H 20/30 |
| 10,512,304 B2 | 12/2019 | Nussbaum et al. | |
| 10,595,581 B2 | 3/2020 | Nussbaum | |
| 10,660,395 B2* | 5/2020 | Kim | G01C 22/006 |
| 10,667,580 B2* | 6/2020 | Kovach | A43C 11/165 |
| 11,510,462 B2 | 11/2022 | Yun | |
| 2002/0152645 A1 | 10/2002 | Darley et al. | |
| 2002/0198069 A1* | 12/2002 | Snyder | G09B 19/0038 473/446 |
| 2004/0221433 A1* | 11/2004 | Wolfberg | A43B 3/0078 24/712.5 |
| 2005/0268436 A1 | 12/2005 | Yoshiguchi | |
| 2007/0166024 A1* | 7/2007 | Robinson | A43B 3/0042 396/429 |
| 2007/0260421 A1 | 11/2007 | Berner | |
| 2008/0098811 A1* | 5/2008 | Brandenburg | A43B 3/0031 73/431 |
| 2008/0115334 A1 | 5/2008 | Chen | |
| 2009/0223085 A1* | 9/2009 | Wolfberg | A43C 7/00 36/50.1 |
| 2009/0293313 A1 | 12/2009 | Bruce et al. | |
| 2011/0016680 A1* | 1/2011 | Chang | A43C 7/00 24/712.5 |
| 2011/0178720 A1 | 7/2011 | Bamburg et al. | |
| 2011/0251822 A1 | 10/2011 | Darley et al. | |
| 2012/0088544 A1 | 4/2012 | Bentley et al. | |
| 2012/0215474 A1 | 8/2012 | Bentley et al. | |
| 2013/0008058 A1 | 1/2013 | Jasmine | |
| 2013/0095941 A1 | 4/2013 | Bentley et al. | |
| 2013/0117975 A1 | 5/2013 | Herrera | |
| 2013/0128022 A1 | 5/2013 | Bose et al. | |
| 2013/0211774 A1 | 8/2013 | Bentley et al. | |
| 2013/0278631 A1* | 10/2013 | Border | G06Q 30/02 345/633 |
| 2014/0085465 A1 | 3/2014 | Angermann et al. | |
| 2014/0260677 A1* | 9/2014 | Dojan | A43C 19/00 73/862.045 |
| 2014/0266160 A1* | 9/2014 | Coza | A63B 47/008 324/207.11 |
| 2014/0376876 A1 | 12/2014 | Bentley et al. | |
| 2015/0059136 A1* | 3/2015 | Schreiner | A43C 7/00 24/712.3 |
| 2015/0154452 A1 | 6/2015 | Bentley et al. | |
| 2015/0223569 A1* | 8/2015 | Cox | A43C 7/00 24/712.9 |
| 2016/0165965 A1* | 6/2016 | Ellis | A43B 3/30 434/81 |
| 2016/0192862 A1* | 7/2016 | Merrell | A61B 5/1038 600/592 |
| 2017/0241797 A1* | 8/2017 | Kong | A61B 5/1123 |
| 2017/0318908 A1* | 11/2017 | Wyatt | A43C 11/008 |
| 2017/0319937 A1* | 11/2017 | Nevell | A43B 5/001 |
| 2018/0146737 A1* | 5/2018 | Goodrich | F21V 33/0008 |
| 2018/0166006 A1* | 6/2018 | Cauwood | G09F 23/0066 |
| 2021/0012877 A1* | 1/2021 | Aragones | G16H 20/30 |
| 2021/0014582 A1* | 1/2021 | Case, Jr. | G06Q 30/0631 |
| 2022/0304423 A1* | 9/2022 | Cappell | A43C 11/20 |

FOREIGN PATENT DOCUMENTS

| | | |
|---|---|---|
| JP | 2009050699 A | 3/2009 |
| JP | 2014504943 A | 2/2014 |
| KR | 20010065023 A | 7/2001 |
| WO | WO2013010171 A1 | 1/2013 |
| WO | WO2013184672 A2 | 12/2013 |
| WO | WO2014036374 A1 | 3/2014 |
| WO | WO2015191157 | 12/2015 |

OTHER PUBLICATIONS

First Office Action issued by the Canadian Intellectual Property Office on Apr. 1, 2020, in Canadian Patent Application No. 2,945,792. (This application is related to U.S. Appl. No. 16/690,908). Reference available in Parent/Continuation U.S. Appl. No. 16/690,908.
Office Action from the State Intellectual Property Office—China, in U.S. Appl. No. 16/690,908, dated Apr. 1, 2021. (This application is related to U.S. Appl. No. 16/690,908). Reference available in Parent/Continuation U.S. Appl. No. 16/690,908.
International Search Report and Written Opinion, issued by European Patent Office, in Application No. PCT/2021/038485, dated

(56) References Cited

OTHER PUBLICATIONS

Oct. 12, 2021. (Related matter). Reference available in Parent/Continuation U.S. Appl. No. 16/690,908.

Office Action issued by the China Intellectual Property Administration, on Nov. 30, 2022, in Chinese Patent Application No. 2021111964284. (Related matter). Reference available in Parent/Continuation U.S. Appl. No. 16/690,908.

Notification Concerning Transmittal of International Preliminary Report on Patentability issued by the International Bureau on Jan. 5, 2023, in PCT patent application serial No. PCT/US2021/038485. (Related matter). Reference available in Parent/Continuation U.S. Appl. No. 16/690,908.

The International Search Report and Written Opinion of the International Searching Authority, dated Jul. 20, 2015, FlyClip LLC, PCT/US15/25763. (related application) NPL Reference Available in the Parent Application, U.S. Appl. No. 15/301,946.

The International Preliminary Report on Patentability, dated Oct. 18, 2016, FlyClip LLC, PCT/US15/25763. (related application). NPL Reference Available in the Parent Application, U.S. Appl. No. 15/301,946.

"Beyond Fitbit: Sensors track hang time, vertical leaps", San Diego Union Tribune Newspaper Article by Mike Freeman dated Jun. 17, 2015, pp. 1-3. NPL Reference Available in the Parent Application, U.S. Appl. No. 15/301,946.

Supplementary European Search Report from the European Patent Office, Application Serial No. 15806231, dated Oct. 16, 2017. NPL Reference Available in the Parent Application, U.S. Appl. No. 15/301,946.

Office Action issued on Feb. 17, 2018 by the State Intellectual Property Office of China in Application No. 2015800318712 (this Chinese application is related to the instant U.S. Application and both claim priority from PCT application PCT/US2015/025763). NPL Reference Available in the Parent Application, U.S. Appl. No. 15/301,946.

Office Action issued on Oct. 17, 2018 by the State Intellectual Property Office of China in Application No. 2015800318712 (this Chinese application is related to the instant U.S. Application and both claim priority from PCT application PCT/US2015/025763). NPL Reference Available in the Parent Application, U.S. Appl. No. 15/301,946.

Office Action issued on Oct. 15, 2018 by the European Patent Office in Application No. 15806231.5 (this EPO application is related to the instant U.S. Application and both claim priority from PCT application PCT/US2015/025763). NPL Reference Available in the Parent Application, U.S. Appl. No. 15/301,946.

Response to Office Action filed on Feb. 14, 2019 with the European Patent Office in Application No. 15806231.5 (this EPO application is related to the instant U.S. Application and both claim priority from PCT application PCT/US2015/025763). NPL Reference Available in the Parent Application, U.S. Appl. No. 15/301,946.

Office Action issued on Mar. 4, 2019 by the Australian Intellectual Property Office in Application No. 2015272024 (this Australian application is related to the instant U.S. Application and both claim priority from PCT application PCT/US2015/025763). NPL Reference Available in the Parent Application, U.S. Appl. No. 15/301,946.

Office Action issued on Mar. 26, 2019 by the Japan Patent Office in Application No. 2016-562003 (this Japanese application is related to the instant U.S. Application and both claim priority from PCT application PCT/US2015/025763). NPL Reference Available in the Parent Application, U.S. Appl. No. 15/301,946.

Office Action issued on Oct. 29, 2019 by the Japan Patent Office in Application No. 2016-562003 (this Japanese application is related to the instant U.S. Application). NPL Reference Available in the Parent Application, U.S. Appl. No. 15/301,946.

Decision on Application issued on Oct. 17, 2023, by the China National Intellectual Property Administration, in CNIPA Application Serial No. 2021111964284. Informal English translation with redactions provided.

International Search Report and Written Opinion, PCT Application Serial No. PCT/US2024/016203, dated Jun. 26, 2024, issued by International Search Authority US.

\* cited by examiner

LACE ADJUSTER ASSEMBLY INCLUDING FEEDBACK ASSEMBLY FOR USE IN VISUALIZING AND MEASURING ATHLETIC PERFORMANCE

RELATED APPLICATIONS

This Application is a continuation application of U.S. application Ser. No. 16/690,908 filed on Nov. 21, 2019, and entitled "LACE ADJUSTER ASSEMBLY INCLUDING FEEDBACK ASSEMBLY FOR USE IN VISULATIZING AND MEASURING ATHLETIC PERFORMANCE. U.S. application Ser. No. 16/690,908, filed Nov. 21, 2019, and entitled "LACE ADJUSTER ASSEMBLY INCLUDING FEEDBACK ASSEMBLY FOR USE IN VISULATIZING AND MEASURING ATHLETIC PERFORMANCE", is a continuation U.S. application Ser. No. 15/301,946 filed on Oct. 4, 2016, and entitled "LACE ADJUSTER ASSEMBLY INCLUDING FEEDBACK ASSEMBLY FOR USE IN VISULATIZING AND MEASURING ATHLETIC PERFORMANCE. U.S. application Ser. No. 15/301,946 filed on Oct. 4, 2016, and entitled "LACE ADJUSTER ASSEMBLY INCLUDING FEEDBACK ASSEMBLY FOR USE IN VISULATIZING AND MEASURING ATHLETIC PERFORMANCE" is a 371 of PCT/US2015/025763 filed on Apr. 14, 2015, and entitled "LACE ADJUSTER ASSEMBLY INCLUDING FEEDBACK ASSEMBLY FOR USE IN VISULATIZING AND MEASURING ATHLETIC PERFORMANCE. PCT Application Serial No: PCT/US2015/025763 is related to and claims priority on (i) U.S. Provisional Application Ser. No. 61/979,491 filed on Apr. 14, 2014, and entitled "LACE ADJUSTER"; (ii) U.S. Provisional Application Ser. No. 62/018,194 filed on Jun. 27, 2014, and entitled "SENSOR ASSEMBLY FOR USE IN MEASURING ATHLETIC PERFORMANCE"; and (iii) U.S. Provisional Application Ser. No. 62/043,822 filed on Aug. 29, 2014, and entitled "IMAGE ASSEMBLY AND SENSOR ASSEMBLY FOR USE IN VISUALIZING AND MEASURING ATHLETIC PERFORMANCE". To the extent permissible, the contents of (i) U.S. application Ser. No. 16/690,908, (ii) U.S. application Ser. No. 15/301,946, (iii) PCT Application Serial No: PCT/US2015/025763, and (iv) U.S. Provisional Application Ser. Nos. 61/979,491, 62/018,194, and 62/043,822 are incorporated herein by reference.

BACKGROUND

Many athletes, professional or amateur, serious or casual, are very interested in visualizing and/or quantifying their athletic performances. Thus, it is desired to provide a device that enables such athletes to effectively visualize and/or gauge various aspects of their athletic performance, which can be subsequently used as a means to view unique perspectives of their athletic performance and/or to improve their athletic performance over time.

Additionally, it is often necessary to adjust, tighten, and untighten (or loosen) the shoelaces of a shoe. Further, it is further desired to inhibit the shoelaces from being a potential tripping hazard for the person wearing the shoes. This can be especially true for an athlete during an athletic performance, as problems with shoelaces being untied, too tight, or too loose, and/or becoming tripping hazards, can lead to suboptimal performance and/or injury.

SUMMARY

The present invention is directed toward a lace adjuster assembly that is adapted to selectively adjust a shoelace of a shoe of a user. In various embodiments, the lace adjuster assembly comprises a lace adjuster and a feedback assembly. The lace adjuster is adapted to selectively adjust the shoelace of the shoe of the user. The feedback assembly is coupled to the lace adjuster. Additionally, the feedback assembly is configured to perform one of (i) selectively measuring statistical data of the user during an athletic performance, and (ii) selectively capturing an image of the user during the athletic performance.

In certain embodiments, the feedback assembly includes a sensor assembly including a first sensor that senses a first performance characteristic of the user during the athletic performance; and a controller that is electrically coupled to the first sensor, the controller including a processor. In such embodiments, the controller receives the first performance characteristic from the first sensor and generates a first statistical data point that is based at least in part on the first performance characteristic. Additionally, the sensor assembly can further comprise a second sensor that senses a second performance characteristic of the user during the athletic performance. In some such embodiments, the controller further receives the second performance characteristic from the second sensor and generates the first statistical data point that is based at least in part on the first performance characteristic and the second performance characteristic. Additionally and/or alternatively, in other such embodiments, the controller further receives the second performance characteristic from the second sensor and generates a second statistical data point that is based at least in part on the second performance characteristic.

In some embodiments, the first sensor senses one or more of a horizontal movement, a vertical movement and an angular movement of the user during the athletic performance. Additionally, the first sensor can be one of a two-axis accelerometer, a three-axis accelerometer and a rate sensor.

Additionally, in certain embodiments, the feedback assembly includes an image capturing assembly that captures an image of the user during the athletic performance. In some such embodiments, the lace adjuster includes an adjuster body and an adjuster cover that is selectively coupled to the adjuster body, and the image capturing assembly is coupled to the adjuster cover. In some such embodiments, the image capturing assembly includes an optical assembly and a capturing system, and the optical assembly focuses light onto the capturing system so that the capturing system can capture the image of the user. The image of the user can be a still image and/or a video image.

In some embodiments, the image capturing assembly further includes a storage device for storing the image of the user, and a transmitter for wirelessly transmitting the image of the user to a remote image device. In such embodiments, the remote image device can include an image display screen that displays the image of the user.

Further, in certain embodiments, the feedback assembly is configured to perform both of (i) selectively measuring statistical data of the user during an athletic performance, and (ii) selectively capturing an image of the user during the athletic performance. In such embodiments, the feedback assembly can include (i) a sensor assembly including a first sensor that senses a first performance characteristic of the user during the athletic performance; and a controller that is electrically coupled to the first sensor, the controller including a processor, the controller receiving the first performance characteristic from the first sensor and generating a first statistical data point that is based at least in part on the first performance characteristic; and (ii) an image capturing assembly that captures an image of the user during the athletic performance.

In some applications, the shoelace includes a first end and a second end. Additionally, the lace adjuster can include (i) a body assembly that is selectively movable between an unlocked configuration and a locked configuration, wherein the shoelace is adjustable relative to the body assembly when the body assembly is in the unlocked configuration, and wherein the shoelace is not adjustable relative to the body assembly when the body assembly is in the locked configuration; and (ii) a lace end retainer that is connected to the body assembly, the lace end retainer securely retaining the first end and the second end of the shoelace, the lace end retainer including a first receiver section that receives the first end of the shoelace, and a first retainer section that securely retains the first end of the shoelace.

The present invention is further directed toward a shoe comprising a shoelace and the lace adjuster assembly as described above that is coupled to the shoelace to selectively adjust the shoelace.

Additionally, the present invention is also directed toward a feedback assembly for coupling to a device for selectively measuring statistical data of a user during an athletic performance and selectively capturing an image of the user during the athletic performance, the feedback assembly comprising: (i) a sensor assembly including a first sensor that senses a first performance characteristic of the user during the athletic performance; and a controller that is electrically coupled to the first sensor, the controller including a processor, the controller receiving the first performance characteristic from the first sensor and generating a first statistical data point that is based at least in part on the first performance characteristic; and (ii) an image capturing assembly that captures an image of the user during the athletic performance.

Further, the present invention is directed toward a lace adjuster assembly for selectively adjusting and securing a shoelace of a shoe, the shoelace including a first end and a second end, the lace adjuster assembly comprising: (i) a body assembly that is selectively movable between an unlocked configuration and a locked configuration, wherein the shoelace is adjustable relative to the body assembly when the body assembly is in the unlocked configuration, and wherein the shoelace is not adjustable relative to the body assembly when the body assembly is in the locked configuration; and (ii) a lace end retainer that is connected to the body assembly, the lace end retainer securely retaining the first end of the shoelace, the lace end retainer including a first receiver section that receives the first end of the shoelace, and a first retainer section that securely retains the first end of the shoelace.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
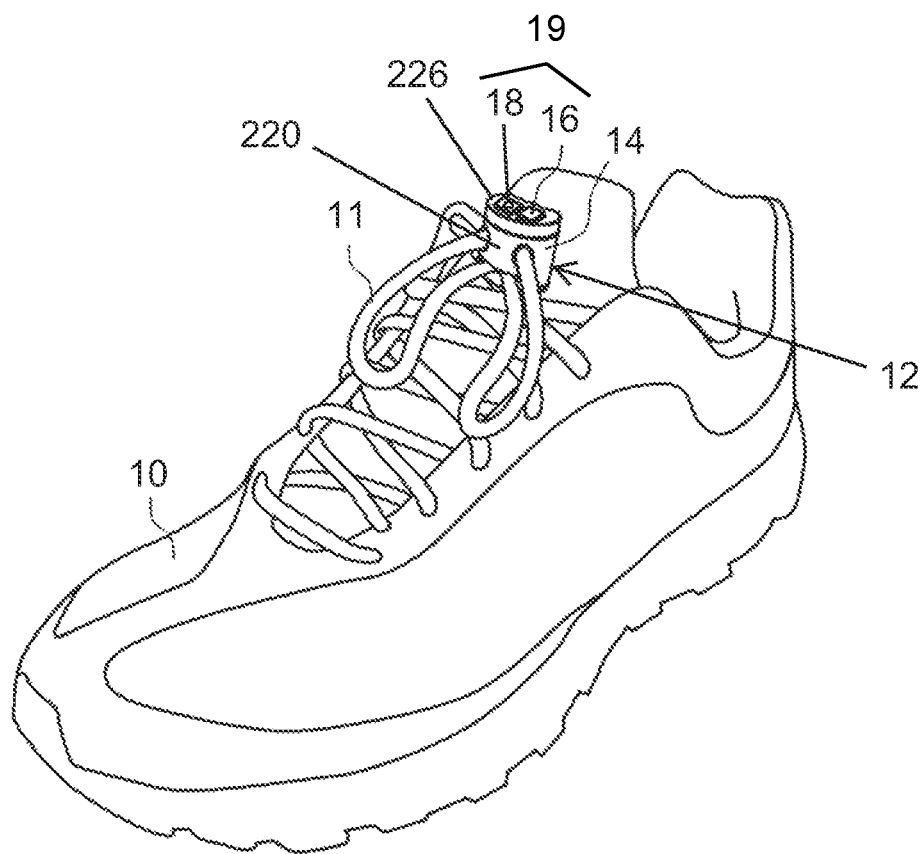
FIG. 1 is a perspective view of a shoe with a shoelace, and an embodiment of a lace adjuster assembly having features of the present invention, the lace adjuster assembly including a lace adjuster, and a sensor assembly and an image capturing assembly that are coupled to the lace adjuster.

FIG. 1 is a perspective view of a shoe 10 with a shoelace 11, and an embodiment of a lace adjuster assembly 12 having features of the present invention. The design of the lace adjuster assembly 12 can be varied as desired. For example, in the embodiment shown in FIG. 1, the lace adjuster assembly 12 includes a device 14, i.e. a lace adjuster, and a sensor assembly 16 and an image capturing assembly 18 (also referred to herein simply as an "image assembly") having features of the present invention that are coupled to the lace adjuster 14. Alternatively, in certain non-exclusive alternative embodiments, the lace adjuster assembly 12 can be designed without the sensor assembly 16 and/or without the image assembly 18.

In some instances, the sensor assembly 16 and the image assembly 18 can be referred to individually and/or collectively as a "feedback assembly" 19. In different embodiments, as noted above, the feedback assembly 19, i.e. the sensor assembly 16 and/or the image assembly 18 can be coupled to the lace adjuster 14. For example, in some embodiments, the lace adjuster 14 can include an adjuster body assembly 220 (illustrated more clearly in FIG. 2A) and an adjuster cover 226 (illustrated more clearly in FIG. 2A) that is coupled to the adjuster body assembly 220. In one such embodiment, as shown in FIG. 1, the sensor assembly 16 and the image assembly 18 can be coupled to the adjuster cover 226. Alternatively, in other such embodiments, the sensor assembly 16 and/or the image assembly 18 can be coupled to another portion of the lace adjuster 14. For example, the sensor assembly 16 and/or the image assembly 18 can be coupled to the adjuster body assembly 220 and/or positioned within the adjuster body assembly 220.

As an overview, the sensor assembly 16 can be uniquely designed to provide an athlete (also referred to herein generally as a "user") who is using the sensor assembly 16, i.e. in conjunction with the lace adjuster 14, with statistical data that enables the athlete to effectively gauge various aspects of their athletic performance. In different embodiments, the sensor assembly 16 can provide statistical data that relates to substantially horizontal movements of the athlete, substantially vertical movements of the athlete, angular and/or rotational movements of the athlete, and/or energy and force expenditures by the athlete during the performance of an athletic activity. For example, in certain embodiments, the sensor assembly 16 can provide the athlete with statistical data related to number of steps taken, total distance traveled, distance traveled per step (i.e. stride length), speed of travel, horizontal burst (i.e. sudden acceleration from an average rate of speed), number of jumps, height of jumps, vertical burst (e.g., take-off velocity or acceleration for a jump), number of accelerations (relating to horizontal burst and/or vertical burst), angular, twisting or rotational movements of the athlete (and/or the speed of such movements), energy expended during athletic performance (e.g., in kcal), and/or force expended during athletic performance (e.g., in psi, kpi, or other force measurements). Additionally, the sensor assembly 16 can further provide the athlete with other desired statistical data.

Moreover, the statistical data that is provided by the sensor assembly 16 can be subsequently utilized by the athlete to tailor their training programs and schedules with the goal of ultimately improving their athletic performance.

Additionally and/or alternatively, in certain embodiments or applications, the sensor assembly 16 can further include Bluetooth and/or GPS capabilities. For example, in some such embodiments, the sensor assembly 16 can include one or more GPS sensors for providing accurate and precise locational information that can be used by the individual wearing the lace adjuster 14. In some such applications, the GPS sensors can be utilized for purposes of navigation so that the individual wearing the lace adjuster 14 always knows where he or she is, as well as where he or she needs to go to reach any desired destination. In such uses, the GPS sensors can be utilized to inhibit the person wearing the lace adjuster 14 from getting lost and/or to enable the wearer to follow a prescribed trail, e.g., during an adventure race and/or when exploring the wilderness.

Further, in other such applications, the GPS sensors can offer a sense of security for someone, e.g., a parent or guardian, who is charged with care for and/or monitoring of the individual wearing the lace adjuster 14. In such applications, the locational information from the GPS sensors can be wirelessly transmitted to a remote receiver so that the parent or guardian can always have the accurate and precise locational information of the person wearing the lace adjuster 14. With such applications, the parent or guardian can help assist the wearer from getting lost and/or inhibit the wearer from going to undesired or inappropriate locations.

Moreover, as provided herein, it should be appreciated that any information from the sensor assembly 16, including information from any of the one or more sensors 456 (illustrated in FIG. 4), can be downloaded into a remote device 470 (illustrated in FIG. 4) via a USB port 471 (illustrated in FIG. 4) or other suitable connection. With such capabilities, the user can view any associated data that was generated during the athletic activity from any of the sensors 456 of the sensor assembly 16. For example, the user can download information into the remote device 470 that was generated using GPS sensors, so the user can precisely see the specific path or trail that was followed, e.g., on foot, by bicycle, etc.

Further, the image assembly 18 can be uniquely designed and/or positioned to provide the athlete who is using the image assembly 18, i.e. in conjunction with the lace adjuster 14, with unique viewpoints from which the athlete is able to visualize and/or evaluate various aspects of their athletic performance. For example, in different embodiments, depending upon the specific positioning and orientation of the image assembly 18 during use, the athlete is able to effectively capture, review and analyze images (e.g., still images and/or video images) of themselves demonstrating unique perspectives and angles of their athletic performance. With such design, the athlete may be able to gather unique insights into their athletic performance, which would not otherwise be available from remote positioning of an image assembly.

For example, the image assembly 18 can provide low resolution or high resolution images or video (and sound). The images or video can be transmitted via Wi-Fi, Bluetooth, or a USB port. In certain embodiments, the images or video can be transmitted for a TV broadcast during a performance or game. The image assembly 18 can be controlled by a button on the lace adjuster 14 or it can be remotely controlled. In the embodiment illustrated in FIG. 1, the image assembly 18 is secured to and/or integrated into a lace adjuster 14. The image, video and sound can be of the person wearing the image assembly 18 and his surrounding environment.

In certain embodiments, the image assembly 18 can be directed in a generally upward or outward direction from the shoe 10 to capture the desired images or video. Additionally, in certain embodiments, the direction of where the image assembly 18 is directed can be controlled and/or adjusted by the user, and/or can be controlled remotely by another individual. Alternatively, the image assembly 18 can be directed in a different direction.

Moreover, as with the sensor assembly 16, it should be appreciated that any information from the image assembly 18 can also be downloaded into the remote device 470 via the USB port 471 or other suitable connection. With such design, the user can view any images from the athletic activity at his or her convenience after completion of the athletic activity.

Further, in certain embodiments, the lace adjuster 14 can be used to easily and quickly tighten or loosen the shoelace 11 of the shoe 10, the shoelace 11 including a first end (not illustrated) and a second end (not illustrated). Additionally, in some embodiments, the lace adjuster 14 can include a lace end retainer 225 (illustrated, for example, in FIG. 2A) that can be utilized to selectively receive and retain the first end and/or the second end of the shoelace 11 so as to inhibit the ends of the shoelace 11 from being potential tripping hazards for the person wearing the shoe 10.

The lace adjuster 14 can have any suitable design. For example, in one embodiment, the lace adjuster 14 can be designed to include various features and limitations such as described in U.S. Pat. No. 8,181,320 B2 issued on May 22, 2012, and entitled "LACE ADJUSTER". Additionally and/or alternatively, the lace adjuster 14 can be designed to include various features and limitations such as described in U.S. Provisional Application Ser. No. 61/979,491 filed on Apr. 14, 2014, and entitled "LACE ADJUSTER". Still additionally and/or alternatively, the lace adjuster 14 can be designed to include various features and limitations such as described in International Patent Application Serial No. PCT/US13/64008 filed on Oct. 9, 2013, and entitled "LACE ADJUSTER WITH INTERCHANGEABLE COVERS". As far as permitted, the contents of U.S. Pat. No. 8,181,320 B2, U.S. Provisional Application Ser. No. 61/979,491, and International Patent Application Serial No. PCT/US13/64008 are incorporated herein by reference.

Figure 2A:
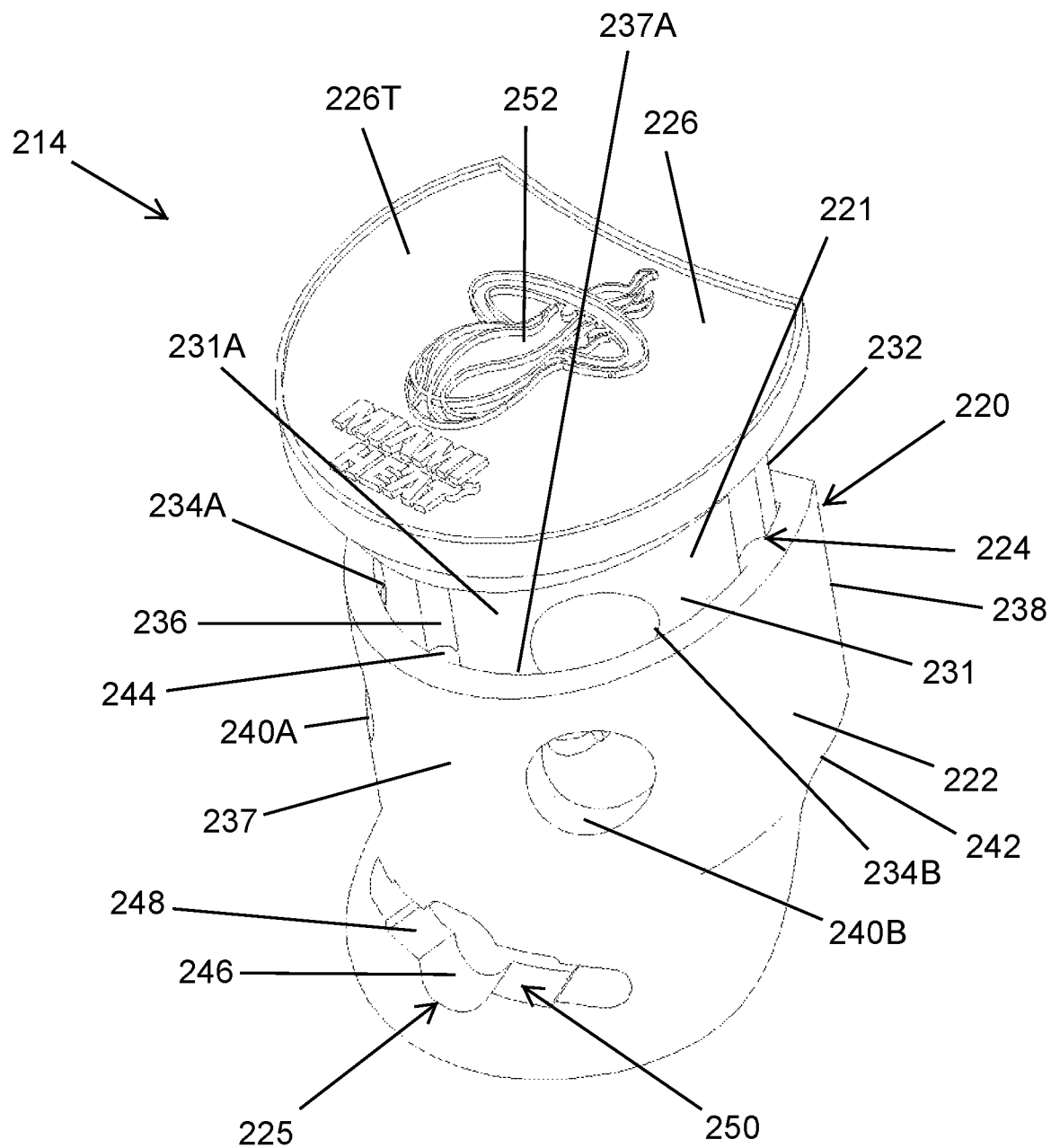
FIG. 2A is a perspective view of an embodiment of the lace adjuster illustrated in FIG. 1.
Figure 2C:
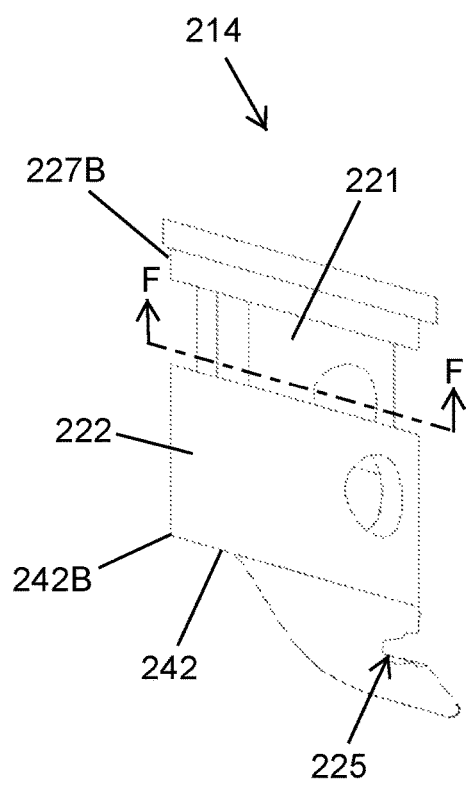
FIG. 2C is a side view of the lace adjuster illustrated in FIG. 2A.
Figure 2B:
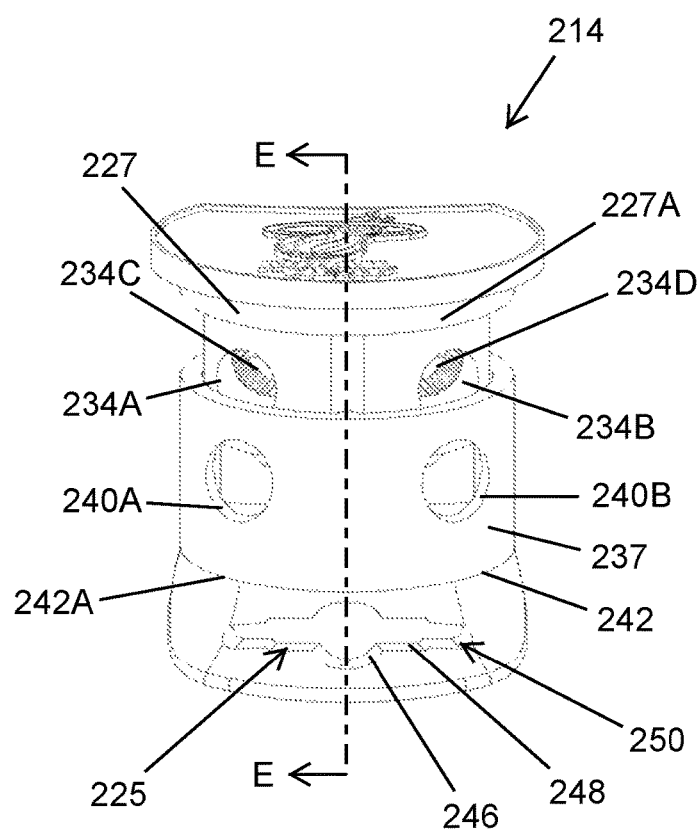
FIG. 2B is a front view of the lace adjuster illustrated in FIG. 2A.
Figure 2D:
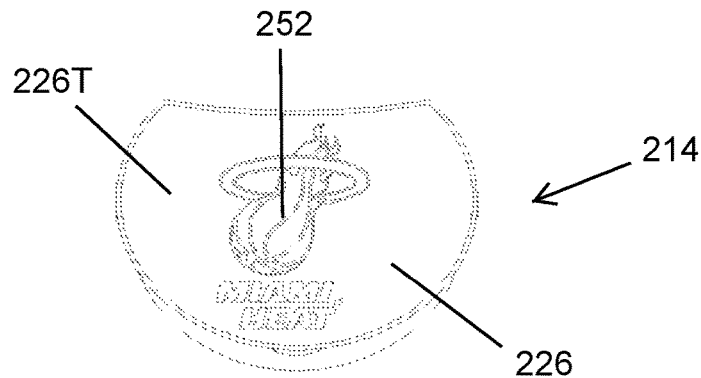
FIG. 2D is a top view of the lace adjuster illustrated in FIG. 2A.
Figure 2E:
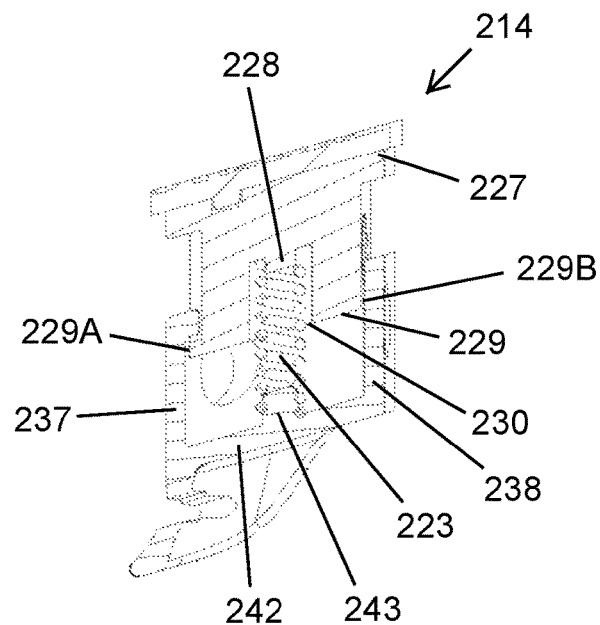
FIG. 2E is a sectional view of the lace adjuster taken on line E-E in FIG. 2B.
Figure 2F:
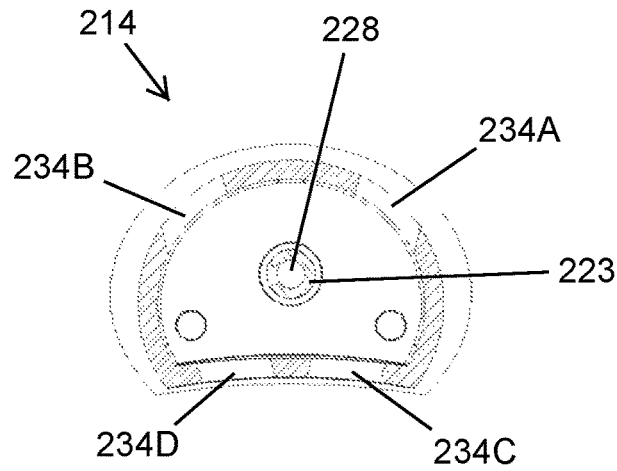
FIG. 2F is a sectional view of the lace adjuster taken on line F-F in FIG. 2C.
Figure 2G:
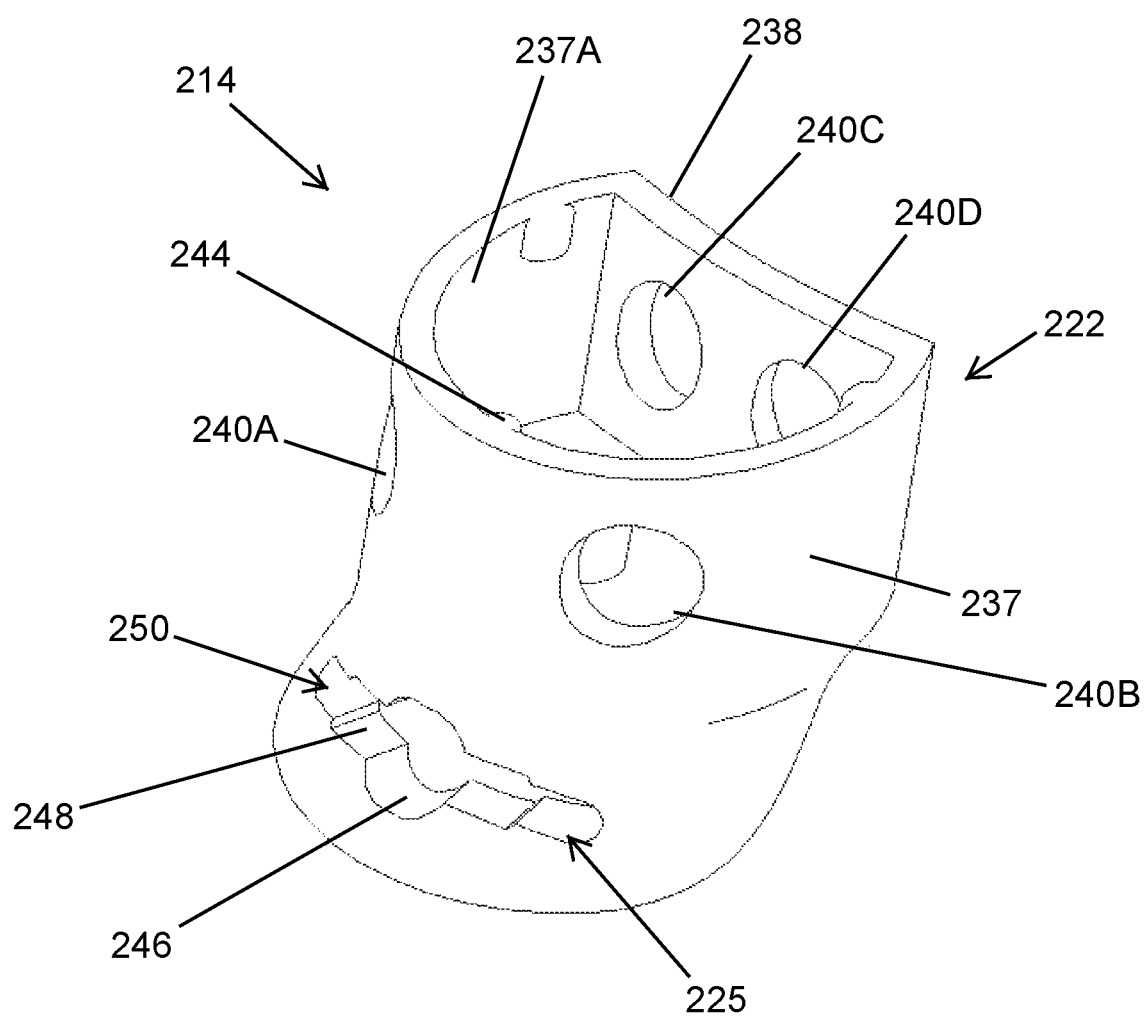
FIG. 2G is a perspective view of a portion of the lace adjuster illustrated in FIG. 2A.

FIGS. 2A-2G are alternative views and configurations of an embodiment of a lace adjuster 214 having features of the present invention. In particular, FIG. 2A is a perspective view of an embodiment of the lace adjuster 214 having features of the present invention; FIG. 2B is a front view of the lace adjuster 214 illustrated in FIG. 2A; FIG. 2C is a side view of the lace adjuster 214 illustrated in FIG. 2A; FIG. 2D is a top view of the lace adjuster 214 illustrated in FIG. 2A; FIG. 2E is a sectional view of the lace adjuster 214 taken on line E-E in FIG. 2B; FIG. 2F is a sectional view of the lace adjuster 214 taken on line F-F in FIG. 2C; and FIG. 2G is a perspective view of a portion of the lace adjuster illustrated in FIG. 2A.

The size and design of the lace adjuster 214 can be varied. Initially referring to FIG. 2A, in this embodiment, the lace adjuster 214 comprises an adjuster body assembly 220 (also referred to herein simply as a "body assembly") including an inner frame 221 (also sometimes referred to as "a first body member") and an outer frame 222 (also sometimes referred to as "a second body member"), a resilient member 223 (illustrated in FIG. 2E), a guide system 224, a lace end retainer 225, and an adjuster cover 226. The design and positioning of each of the components of the lace adjuster 214 can be varied pursuant to the teachings provided herein. Additionally, the lace adjuster 214 can be designed without one or more of the components as listed above. For example, the lace adjuster 214 can be designed without the guide system 224 and/or without the adjuster cover 226.

Moreover, in this embodiment, the sensor assembly 16 and the image assembly 18 can be coupled to the adjuster cover 226 (as shown in FIG. 1). Alternatively, as noted above, in other embodiments, the sensor assembly 16 and/or the image assembly 18 can be coupled to another portion of the lace adjuster 214, e.g., to the inner frame 221 and/or the outer frame 222 of the body assembly 220, and/or can be positioned and/or secured within the body assembly 220.

Further, it should be appreciated that the alternative reference to the inner frame 221 as the "first body member" and the outer frame 222 as the "second body member" is merely for reasons of convenience, and either frame 221, 222 can be referred to as the "first body member" or the "second body member".

As described in detail herein below, the first body member, i.e. the inner frame 221, is resiliently coupled to the second body member, i.e. the outer frame 222. Further, in some embodiments, the adjuster body assembly 220 can be selectively moved between a locked configuration (illustrated in FIGS. 2A-2F) and an unlocked configuration (not illustrated) in order to enable the proper functioning of the lace adjuster 214. For example, in certain embodiments, the shoelace 11 (illustrated in FIG. 1) is adjustable relative to the adjuster body assembly 220 when the adjuster body assembly 220 is in the unlocked configuration, and the shoelace 11 is not adjustable relative to the adjuster body assembly 220 when the adjuster body assembly 220 is in the locked configuration.

In particular, in certain embodiments, the inner frame 221 and the outer frame 222 can be moved relative to one another between the locked configuration and the unlocked configuration. More specifically, in the embodiment illustrated in FIG. 2A, the inner frame 221 fits partly within and moves up and down (i.e. when the lace adjuster 214 is oriented vertically) relative to the outer frame 222 as the inner frame 221 and the outer frame 222 move between the locked configuration and the unlocked configuration. Additionally, as illustrated in FIG. 2A, the inner frame 221 is positioned substantially above the outer frame 222. Alternatively, the inner frame 221 can be positioned substantially beneath the outer frame 222 without altering the general functioning of the lace adjuster 214 of the present invention.

The movement of the inner frame 221 and the outer frame 222 relative to one another between the locked configuration and the unlocked configuration is substantially similar to the movement of an inner frame and an outer frame of a somewhat comparable lace adjuster relative to one another between a locked configuration and an unlocked configuration as illustrated and described in U.S. Pat. No. 8,181,320 issued on May 22, 2012, entitled "LACE ADJUSTER". As far as is permitted, the contents of U.S. Pat. No. 8,181,320 are incorporated herein by reference.

The design and positioning of the inner frame 221 can be varied depending on the requirements of the lace adjuster 214. In this embodiment, the inner frame 221 includes: (i) a top side 227 (illustrated in FIG. 2E) having a member receiver 228 (illustrated in FIG. 2E); (ii) a bottom side 229 (illustrated in FIG. 2E) having a member aperture 230 (illustrated in FIG. 2E); (iii) a front side 231 having a first inner frame aperture 234A and a spaced apart second inner frame aperture 234B; (iv) a back side 232 having a third inner frame aperture 234C (illustrated in FIG. 2B) and a spaced apart fourth inner frame aperture 234D (illustrated in FIG. 2B); and (v) a plurality of guide slots 236. It should be noted that the use of the terms first through fourth for the inner frame apertures 234A-234D is done for convenience only, and that any of the inner frame apertures 234A-234D can be labeled as the "first inner frame aperture", the "second inner frame aperture", the "third inner frame aperture", and/or the "fourth inner frame aperture".

As shown, in some embodiments, the top side 227 can be substantially semi-circular disc-shaped, with a front edge 227A (illustrated more clearly in FIG. 2B) that is substantially semi-circular shaped and a back edge 227B (illustrated in FIG. 2C) that can be substantially flat or slightly curved, wherein the back edge 227B is designed to face the shoe 10 (illustrated in FIG. 1) so as to allow the lace adjuster 214 to rest stably against the shoe 10. Additionally, as illustrated, the top side 227 has a similar shape as the bottom side 229 of the inner frame 221, with the top side 227 being slightly larger than the bottom side 229. Alternatively, the top side 227, e.g., the front edge 227A and the back edge 227B, can have a different design and/or shape than that illustrated in the Figures. For example, the top side 227 can be substantially circular disc-shaped, substantially square disc-shaped, or substantially rectangle disc-shaped.

The member receiver 228 is adapted to receive and retain a portion of the resilient member 223 in order to secure the resilient member 223 to the inner frame 221. In one embodiment, the member receiver 228 is positioned substantially centrally on the surface of the top side 227 of the inner frame 221 that faces the outer frame 222. Alternatively, the member receiver 228 can be positioned in a different manner relative to the top side 227 of the inner frame 221.

Additionally, as shown in this embodiment, the bottom side 229 can be substantially semi-circular disc-shaped, with a front edge 229A (illustrated in FIG. 2E) that is substantially semi-circular shaped and a back edge 229B (illustrated in FIG. 2E) that can be substantially flat or slightly curved, wherein the back edge 229B is designed to face the shoe 10 so as to allow the lace adjuster 214 to rest stably against the shoe 10. Additionally, as illustrated, the bottom side 229 has a similar shape as the top side 227 of the inner frame 221, with the bottom side 229 being slightly smaller than the top side 227. Alternatively, the bottom side 229, e.g., the front edge 229A and the back edge 229B, can have a different design and/or shape than that illustrated in the Figures. For example, the bottom side 229 can be substantially circular disc-shaped, substantially square disc-shaped, or substantially rectangle disc-shaped.

The member aperture 230 is adapted to receive the resilient member 223. Additionally, the member aperture 230 allows the resilient member 223 to extend between the top side 227 of the inner frame 221 and the outer frame 222. In one embodiment, the member aperture 230 is positioned substantially centrally on the bottom side 229 of the inner frame 221 and extends fully through the bottom side 229 of the inner frame 221. Alternatively, the member aperture 230 can be positioned in a different manner relative to the bottom side 229 of the inner frame 221.

To substantially correspond with the shape of the front edge 227A of the top side 227 and the front edge 229A of the bottom side 229, the front side 231 of the inner frame 221 is substantially curved in shape. Additionally, the front side 231 cantilevers upward away from the perimeter of the front edge 229A of the bottom side 229, and the front side 231 cantilevers downward away from near the perimeter of the front edge 227A of the top side 227. Alternatively, the front side 231 can be designed with a different shape and/or to extend away from the bottom side 229 and the top side 227 in a different manner and/or from a different location.

As noted above, the front side 231 of the inner frame 221 includes the first inner frame aperture 234A and the spaced apart second inner frame aperture 234B. Alternatively, the front side 231 of the inner frame 221 can be designed to include more than two or less than two inner frame apertures.

To substantially correspond with the shape of the back edge 227B of the top side 227 and the back edge 229B of the bottom side 229, the back side 232 of the inner frame 221 can be substantially flat or slightly curved. Additionally, the back side 232 cantilevers upward away from the perimeter of the back edge 229B of the bottom side 229, and the back side 232 cantilevers downward away from near the perimeter of the back edge 227B of the top side 227. Alternatively, the back side 232 can be designed with a different shape and/or to extend away from the bottom side 229 and the top side 227 in a different manner and/or from a different location.

As noted above, the back side 232 of the inner frame 221 includes the third inner frame aperture 234C and the spaced apart fourth inner frame aperture 234D. Alternatively, the back side 232 of the inner frame 221 can be designed to include more than two or less than two inner frame apertures.

In the embodiment illustrated in FIGS. 2A-2F, the plurality of guide slots 236 are positioned spaced apart around an outer surface 231A of the front side 231 of the inner frame 221. As described in greater detail herein below, the guide slots 236 form a portion of the guide system 224. The design and positioning of the guide slots 236 can be varied to suit the requirements of the lace adjuster 214. In this embodiment, the inner frame 221 includes three spaced apart guide slots 236 (only two are visible in FIG. 2A) that are designed to receive a portion of the outer frame 222, to help in guiding the desired relative movement between the inner frame 221 and the outer frame 222, i.e. between the locked configuration and the unlocked configuration, and to limit any undesired relative movement between the inner frame 221 and the outer frame 222, i.e. in directions other than is necessary for movement between the locked configuration and the unlocked configuration. In alternative embodiments, the guide slots 236 can be substantially U-shaped, substantially V-shaped or some other shape. Still alternatively, the inner frame 221 can be designed with more than three or less than three guide slots 236.

In this embodiment, the outer frame 222 is open along the top and, as such, is designed to receive at least a portion of the inner frame 221 and to allow the inner frame 221 to move up and down over a movement range relative to the outer frame 222, i.e. such that the inner frame 221 and the outer frame 222 can move between the locked configuration and the unlocked configuration. The design and positioning of the outer frame 222 can be varied depending on the requirements of the lace adjuster 214. In this embodiment, the outer frame 222 includes: (i) a front side 237 having a first outer frame aperture 240A and a spaced apart second outer frame aperture 240B; (ii) a back side 238 having a third outer frame aperture 240C (illustrated in FIG. 2G) and a spaced apart fourth outer frame aperture 240D (illustrated in FIG. 2G); (iii) a bottom side 242 having a member receiver 243 (illustrated in FIG. 2E); and (iv) a plurality of guide tabs 244. It should be noted that the use of the terms first through fourth for the outer frame apertures 240A-240D is done for convenience only, and that any of the outer frame apertures 240A-240D can be labeled as the "first outer frame aperture", the "second outer frame aperture", the "third outer frame aperture", and/or the "fourth outer frame aperture".

As illustrated in FIGS. 2A-2F, the outer frame 222 is positioned substantially beneath the inner frame 221. Alternatively, the outer frame 222 can be positioned substantially above the inner frame 221 without altering the general functioning of the lace adjuster 214 of the present invention.

The front side 237 of the outer frame 222 is substantially curved in shape, and it cantilevers upward away from the perimeter of a portion of the bottom side 242. Alternatively, the front side 237 can be designed with a different shape and/or to extend away from the bottom side 242 in a different manner and/or from a different location.

Additionally, as noted above, the front side 237 of the outer frame 222 includes the first outer frame aperture 240A and the spaced apart second outer frame aperture 240B. Alternatively, the front side 237 of the outer frame 222 can be designed to include more than two or less than two outer frame apertures.

The back side 238 of the outer frame 222 can be substantially flat or slightly curved, and it cantilevers upward away from the perimeter of a portion of the bottom side 242. Alternatively, the back side 238 can be designed with a different shape and/or to extend away from the bottom side 242 in a different manner and/or from a different location.

Additionally, as noted above, the back side 238 of the outer frame 222 includes the third outer frame aperture 240C and the spaced apart fourth outer frame aperture 240D. Alternatively, the back side 238 of the outer frame 222 can be designed to include more than two or less than two outer frame apertures.

The bottom side 242 is substantially semi-circular disc-shaped, with a front edge 242A (illustrated in FIG. 2B) that is substantially semi-circular shaped and a back edge 242B (illustrated in FIG. 2C) that is substantially flat or slightly curved, wherein the back edge 242B is designed to face the shoe 10 so as to allow the lace adjuster 214 to rest stably against the shoe 10. As illustrated, the bottom side 242 has a similar shape as the bottom side 229 of the inner frame 221, with the bottom side 242 of the outer frame 222 being slightly larger than the bottom side 229 of the inner frame 221, so as to allow the inner frame 221 to move within and relative to the outer frame 222. Alternatively, the bottom side 242 can be designed with a different shape. For example, the bottom side 242 can be substantially circular disc-shaped, substantially square disc-shaped, or substantially rectangle disc-shaped.

The member receiver 243 is adapted to receive and retain a portion of the resilient member 223 in order to secure the resilient member 223 to the outer frame 222. In one embodiment, the member receiver 243 is positioned substantially centrally on the surface of the bottom side 242 of the outer frame 222 that faces the inner frame 221. Alternatively, the member receiver 243 can be positioned in a different manner relative to the bottom side 242 of the outer frame 222.

In the embodiment illustrated in FIGS. 2A-2G, the plurality of guide tabs 244 are positioned spaced apart around an inner surface 237A of the front side 237 of the outer frame 222. As provided in greater detail herein below, the guide tabs 244 form a portion of the guide system 224. The design and positioning of the guide tabs 244 can be varied to suit the requirements of the lace adjuster 214. In this embodiment, the outer frame 222 includes three spaced apart guide tabs 244 (only two are visible in FIG. 2A) that are designed to be positioned within the plurality of guide slots 236 of the inner frame 221 and to help in guiding the movement of the inner frame 221 relative to the outer frame 222, i.e. between the locked configuration and the unlocked configuration. In alternative embodiments, the guide tabs 244 can be substantially U-shaped, substantially V-shaped or some other shape. Alternatively, the outer frame 222 can be designed with more than three or less than three guide tabs 244.

As noted above, the inner frame 221 and the outer frame 222 are designed to move relative to each other between the locked configuration and the unlocked configuration. In the unlocked configuration, the inner frame apertures 234A-234D are substantially aligned with and concentric with the outer frame apertures 240A-240D. More particularly, in the unlocked configuration, the inner frame 221 is positioned substantially within the outer frame 222, the first inner frame aperture 234A is substantially aligned with and concentric with the first outer frame aperture 240A, the second inner frame aperture 234B is substantially aligned with and concentric with the second outer frame aperture 240B, the third inner frame aperture 234C is substantially aligned with and concentric with the third outer frame aperture 240C, and the fourth inner frame aperture 234D is substantially aligned with and concentric with the fourth outer frame aperture 240D. In the locked configuration, the inner frame 221 extends somewhat away from the outer frame 222, and the inner frame apertures 234A-234D are positioned so that they are not aligned with or concentric with the outer frame apertures 240A-240D.

The design of the resilient member 223 can be varied depending on the requirements of the lace adjuster 214. For example, in the embodiment illustrated in FIGS. 2A-2G, the resilient member 223 is a spring. Alternatively, the resilient member 223 can be another piece of resilient material. The resilient member 223 is secured to the inner frame 221 and the outer frame 222 and extends between the inner frame 221 and the outer frame 222. More particularly, the resilient member 223 is secured to the inner frame 221 via the member receiver 228, and the resilient member 223 is secured to the outer frame 222 via the member receiver 243. In this embodiment, the resilient member 223 urges the inner frame 221 up and/or away relative to the outer frame 222. Stated in another manner, the resilient member 223 biases the inner frame 221 and the outer frame 222 toward the locked configuration. Alternatively, the resilient member 223 can be designed to urge the inner frame 221 within the outer frame 222. In such alternative embodiment, the lace adjuster 214 would further require a locking mechanism (not illustrated) that would maintain the inner frame 221 and the outer frame 222 in the locked configuration. In these alternative embodiments, the resilient member 223 is either extended or compressed as the inner frame 221 and the outer frame 222 are moved between the locked configuration and the unlocked configuration.

The guide system 224 guides the movement of the inner frame 221 (e.g., up and down when the lace adjuster 214 is oriented vertically) relative to the outer frame 222. The design of the guide system 224 can be varied to suit the requirements of the lace adjuster 214. In the embodiment illustrated in FIGS. 2A-2G, the guide system 224 includes the plurality of guide slots 236 and the plurality of guide tabs 244. Each of the plurality of guide slots 236 is designed and positioned to receive one of the plurality of guide tabs 244. As discussed above, the guide slots 236 can be substantially U-shaped, substantially V-shaped, or some other shape slots along the outer surface 231A of the front side 231 of the inner frame 221. Similarly, the guide tabs 244 can be substantially U-shaped, substantially V-shaped, or some other shape tabs along the inner surface 237A of the front side 237 of the outer frame 222. Alternatively, the inner frame 221 can be designed with more than three or less than three guide slots 236, and the outer frame 222 can be designed with more than three or less than three guide tabs 244. Still alternatively, the lace adjuster 214 can be designed wherein the inner frame 221 includes a plurality of guide tabs and the outer frame 222 includes a plurality of guide slots. Yet alternatively, the guide system 224 can have a different design that guides the relative movement between the inner frame 221 and the outer frame 222 in a different manner.

The lace end retainer 225 is designed to securely retain the first end and/or the second end of the shoelace 11. Additionally, as shown, the lace end retainer 225 is connected to the body assembly 220. In particular, the lace end retainer 225 can be coupled to the body assembly 220, i.e. to one or both of the inner frame 221 and the outer frame 222, and/or the lace end retainer 225 can be integrally formed with the body assembly 220. For example, as illustrated, the lace end retainer 225 can be included as part of and/or be integrally formed with the outer frame 222. More specifically, as illustrated in this embodiment, the lace end retainer 225 can extend in a generally downward direction away from the bottom side 242 of the outer frame 222, and the lace end retainer 225 can extend somewhat outwardly away from the front side 237 of the outer frame 222. Alternatively, the lace end retainer 225 can be included as part of and/or be integrally formed with the inner frame 221. Still alternatively, the lace end retainer 225 can be separately formed and can be coupled to the outer frame 222 and/or the inner frame 221.

The design of the lace end retainer 225 can be varied to suit the specific requirements of the lace adjuster 214, the shoelace 11 and/or the shoe 10. In some embodiments, the lace end retainer 225 can include one or more receiver sections 246 that receive the first end and/or the second end of the shoelace 11; and one or more retainer sections 248 that securely retain the first end and/or the second end of the shoelace 11. For example, in the embodiment illustrated in FIGS. 2A-2G, the lace end retainer 225 includes one substantially centrally positioned receiver section 246, and four retainer sections 248, with two retainer sections 248 positioned on either side of the receiver section 246. Additionally, in this embodiment, the receiver section 246 and the retainer sections 248 are formed within a single common retainer aperture 250. Alternatively, each of the one or more receiver sections 246 and the one or more retainer sections 248 can be spaced apart from one another, or combined with one another and/or be formed within one or more retainer apertures 250 in any suitable manner. For example, in one non-exclusive alternative embodiment, the lace end retainer 225 can be formed with a first receiver section and a first retainer section that are formed within a first retainer aperture for purposes of receiving and retaining the first end of the shoelace 11; and a second receiver section and a second retainer section that are formed within a second retainer aperture for purposes of receiving and retaining the second end of the shoelace 11. In another non-exclusive alternative embodiment, the lace end retainer 225 can include a first receiver section for receiving the first end of the shoelace, a second receiver section for receiving the second end of the shoelace 11, and a single retainer section for securely retaining each of the first end and the second end of the shoelace 11.

As noted above, the receiver section 246 is adapted to receive the first end and/or the second end of the shoelace 11. Additionally, in this embodiment, the receiver section 246 is substantially circular-shaped and is substantially centrally positioned below the front side 237 of the outer frame 222. Alternatively, the receiver section 246 can have a different shape and/or the receiver section 246 can be positioned in a different manner. Still alternatively, the lace end retainer 225 can include more than one receiver section 246.

Additionally, as noted above, the retainer sections 248 are adapted to securely retain the first end and/or the second end of the shoelace 11. Further, as noted, two retainer sections 248 are positioned on either side of the receiver section 246, with the receiver section 246 and the retainer sections 248 being formed within the single common retainer aperture 250. In this embodiment, each of the retainer sections 248 are substantially slot-shaped, with the retainer sections 248 positioned directly adjacent to the receiver section 246 being slightly larger than the retainer sections 248 that are positioned farther away from the receiver section 246. With this design, the lace end retainer 225 is able to effectively and securely retain different sizes, e.g., different thicknesses, of shoelaces. Alternatively, the retainer sections 248 can have different shapes, different sizes, and/or be positioned in a different manner than as shown in the Figures. Still alternatively, the lace end retainer 225 can include more than four or less than four retainer sections 248.

During use of the lace adjuster 214, after the shoelace 11 has been effectively threaded through the inner frame apertures 234A-234D and the outer frame apertures 240A-240D, (i) the first end of the shoelace 11 can be threaded into the receiver section 246 of the lace end retainer 225 and then moved to the side so as to be securely retained within one of the retainer sections 248 (i.e. an appropriately sized retainer section 248); and (ii) the second end of the shoelace 11 can be threaded into the receiver section 246 of the lace end retainer 225 and then also moved to the side so as to be securely retained within one of the retainer sections 248 (i.e. an appropriately sized retainer section 248). With the ends of the shoelace 11 thus securely retained within one or more of the retainer sections 248, a potential tripping hazard for the wearer of the shoe 10 can be effectively inhibited. It should be appreciated that each of the first end and the second end of the shoelace 11 can be retained within the same or different retainer sections 248 of the lace end retainer 225.

As illustrated in this embodiment, the adjuster cover 226 can be selectively secured to and/or coupled to the top side 227 of the inner frame 221. In alternative embodiments, the adjuster cover 226 can be selectively secured and/or coupled to the top side 227 of the inner frame 221 in any suitable manner. For example, the inner frame 221 can include a plurality of spaced apart cover apertures (not illustrated), and the adjuster cover 226 can include a plurality of spaced apart cover pins (not illustrated) that are positioned to be selectively received by the cover apertures to secure and/or couple the adjuster cover 226 to the inner frame 221. Alternatively, the inner frame 221 can include a plurality of spaced apart cover pins and the adjuster cover 226 can include a plurality of spaced apart cover apertures that are positioned to selectively receive the cover pins. Still alternatively, each of the inner frame 221 and the adjuster cover 226 can include hook and loop material, e.g., Velcro, magnets, two-sided tape, lip/groove combinations, bumps/indentations combinations, or other suitable devices so that the adjuster cover 226 can be effectively secured to and/or coupled to the inner frame 221. Potential means of attachment between the adjuster cover 226 and the inner frame 221 are described in greater detail in International Patent Application Serial No. PCT/US13/64008 filed on Oct. 9, 2013, entitled "LACE ADJUSTER WITH INTERCHANGEABLE COVERS". As far as is permitted, the contents of International Patent Application Serial No. PCT/US13/64008 are incorporated herein by reference.

Yet alternatively, the design and positioning of the adjuster cover 226 can be varied depending on the requirements of the lace adjuster 214. For example, in certain embodiments, the adjuster cover 226 can be secured to and/or coupled to the outer frame 222 in any suitable manner.

As illustrated, the adjuster cover 226 is substantially semi-circular disc-shaped, very similar to the shape of the top side 227 of the inner frame 221. Alternatively, the adjuster cover 226 can be designed with a different shape. For example, the adjuster cover 226 can be substantially circular disc-shaped, substantially square disc-shaped, or substantially rectangle disc-shaped. Additionally, the adjuster cover 226 can include a design 252, e.g., a sports logo as shown in this embodiment, on a top surface 226T of the adjuster cover 226 that enables the lace adjuster 214 to have a more interesting appearance. Moreover, in this embodiment, with the adjuster cover 226 being designed to be selectively attached to the inner frame 221, different adjuster covers 226 with alternative designs 252 can be quickly and easily attached to the rest of the lace adjuster 214.

As provided above, FIG. 2G is a perspective view of a portion of the lace adjuster 214 illustrated in FIG. 2A. In particular, FIG. 2G is a perspective view of the outer frame 222 of the lace adjuster 214. It should be appreciated that without the inner frame 221 being included in FIG. 2G, certain design features and aspects of this embodiment of the outer frame 222 can be more clearly illustrated. For example, FIG. 2G more clearly illustrates the third outer frame aperture 240C and the fourth outer frame aperture 240D. Additionally, FIG. 2G more clearly illustrates the overall shape of the front side 237 and the back side 238 of the outer frame 222.

In summary, in the embodiment illustrated in FIGS. 2A-2G, (i) the inner frame 221 fits partly within and moves up and down relative to the outer frame 222 between the locked configuration and the unlocked configuration; (ii) the resilient member 223 extends between the inner frame 221 and the outer frame 222 and urges the inner frame 221 upward such that the inner frame 221 is biased relative to the outer frame 222 toward the locked configuration; (iii) the inner frame 221 includes a first inner frame aperture 234A, a second inner frame aperture 234B, a third inner frame aperture 234C, and a fourth inner frame aperture 234D, which are each spaced apart from the other inner frame apertures; (iv) the outer frame 222 includes a first outer frame aperture 240A, a second outer frame aperture 240B, a third outer frame aperture 240C, and a fourth outer frame aperture 240D, which are each spaced apart from the other outer frame apertures; (v) the inner frame apertures 234A-234D are substantially aligned with and concentric with the outer frame apertures 240A-240D when the inner frame 221 and the outer frame 222 are in the unlocked configuration, thereby allowing the shoelace 11 to be threaded through the inner frame apertures 234A-234D and the outer frame apertures 240A-240D; (vi) the inner frame apertures 234A-234D are not aligned with and concentric with the outer frame apertures 240A-240D when the inner frame 221 and the outer frame 222 are in the locked configuration, thereby allowing the shoelace 11 to be held securely between the inner frame 221 and the outer frame 222; (vii) the first end of the shoelace 11 can be threaded into the receiver section 246 of the lace end retainer 225; (viii) the second end of the shoelace 11 can be threaded into the receiver section 246 of the lace end retainer 225; and (ix) the first end and the second end of the shoelace 11 can be moved to the side so as to be positioned in and securely retained within one of the retainer sections 248 of the lace end retainer 225.

As noted above, in various embodiments, the feedback assembly 19, i.e. the sensor assembly 16 and/or the image assembly 18, can be coupled to the lace adjuster 214. For example, in some embodiments, as noted above, the lace adjuster 214 includes the adjuster body assembly 220 and the adjuster cover 226 that is selectively coupled to the adjuster body assembly 220. In one such embodiment, as shown in FIG. 1, the sensor assembly 16 and the image assembly 18 can be coupled to the adjuster cover 226. Alternatively, in another such embodiment, the sensor assembly 16 and/or the image assembly 18 can be coupled to the adjuster body assembly 220 or positioned within the adjuster body assembly 220.

Figure 3:
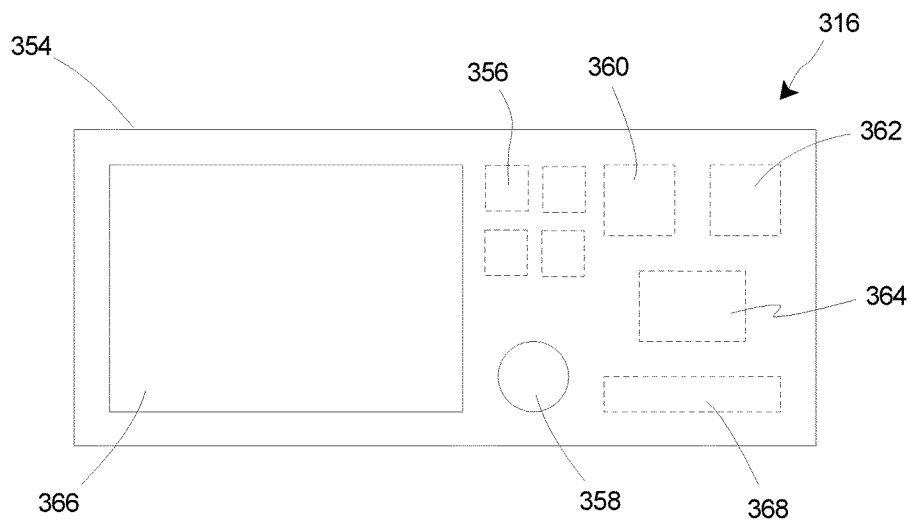
FIG. 3 is a simplified schematic illustration of an embodiment of the sensor assembly illustrated in FIG. 1.

FIG. 3 is a simplified schematic illustration of an embodiment of the sensor assembly 316 illustrated in FIG. 1. The design of the sensor assembly 316 can be varied. For example, as illustrated in FIG. 3, the sensor assembly 316 can include an assembly body 354, one or more sensors 356 (four are illustrated as boxes in phantom in FIG. 3), an input mechanism 358, a storage device 360 (illustrated as a box in phantom), a transmitter 362 (illustrated as a box in phantom), a controller 364 (illustrated as a box in phantom), a display screen 366, and a power source 368 (illustrated in phantom). As shown, in this embodiment, each of the one or more sensors 356, the input mechanism 358, the storage device 360, the transmitter 362, the controller 364, the display screen 366 and the power source 368 can be coupled to and/or positioned substantially within the assembly body 354. The design of each of these components can be varied to suit the design requirements of the sensor assembly 316. Alternatively, the sensor assembly 316 can have another suitable design, which can comprise more or fewer components than those specifically illustrated in FIG. 3. Still alternatively, one or more of the components can be provided remotely from the assembly body 354.

As shown, in one embodiment, the assembly body 354 can provide a housing for the one or more sensors 356, the input mechanism 358, the storage device 360, the transmitter 362, the controller 364, the display screen 366 and the power source 368. The design of the assembly body 354 can be varied. For example, in one embodiment, the assembly body 354 is substantially rectangular box-shaped. Alternatively, the assembly body 354 can have another suitable shape.

As noted above, the sensor assembly 316 can provide the athlete with various statistical data and/or performance measurables that enable the athlete to effectively gauge various aspects of their athletic performance. In order to effectively provide such statistical data and/or performance measurables, the sensor assembly 316 needs the one or more sensors 356 to encompass certain features in order to sense the appropriate performance variables. For example, in certain embodiments, the one or more sensors 356 can include one or more two-axis accelerometers, a three-axis accelerometer, a gyrometer (or gyroscope) and/or another type of rate sensor, and/or a magnetometer. Additionally and/or alternatively, the one or more sensors 356 can include additional appropriate sensor types.

As discussed herein, the one or more sensors 356 can be effectively utilized to sense various performance characteristics, which can be subsequently utilized to generate usable statistical data and/or performance measurables for the athlete. For example, the two-axis accelerometers can be utilized to measure and/or sense acceleration of the athlete during his or her performance along two axes. More specifically, one two-axis accelerometer can be utilized to measure and/or sense acceleration of the athlete along the horizontal axes (i.e. the X axis and the Y axis); and other two-axis accelerometers can be utilized to measure and/or sense acceleration of the athlete along one horizontal axis (i.e. either the X axis or the Y axis) and the vertical axis (i.e. the Z axis). Additionally, the three-axis accelerometer can be utilized to measure and/or sense acceleration of the athlete along all three axes (i.e. along the X axis, the Y axis and the Z axis). It should be appreciated that by comparing the performance characteristics measured and/or sensed by the three-axis accelerometers to the performance characteristics measured and/or sensed by each of the two-axis accelerometers (i.e. by subtracting two-axis data from the three-axis data), accurate acceleration data can be determined along each individual axis to effectively isolate vertical and horizontal acceleration of the athlete.

Further, the gyrometer (or gyroscope) or other type of rate sensor can be utilized to measure and/or sense orientation information for the athlete as a means to ultimately provide usable data with regard to angular movements of the athlete (e.g., twist and rotation) during performance of the athletic activity or event. Still further, the magnetometer can be utilized to measure the strength (i.e. magnitude) and direction of magnetic fields at a point in space in relation to the various movements of the athlete.

It should be appreciated that any and all of the performance characteristics measured and/or sensed by the one or more sensors 356 can be combined in any suitable manner to enable the generation of various statistical data and/or performance measurables for the athlete during the performance of an athletic activity or event.

It should further be appreciated that in order to more effectively evaluate the various statistical data from the athletic performances, the athlete may desire to provide certain input information, such as the height and weight of the athlete. In one embodiment, the athlete may manually input such information as height and weight into the sensor assembly 316 and/or the controller 364 via the input mechanism 358. Alternatively, information such as the height and weight of the athlete can be provided to the sensor assembly 316 and/or the controller 364 in another suitable manner. This information can further be utilized to see the effects of people's height and weight on the performance data.

Moreover, the athlete can further provide such information as most recent food and/or liquid intake, latest sleeping experience, most recent exercise and extent thereof, etc. as a means to help define when the athlete may be able to experience optimum performance.

Further, as noted above, in certain embodiments or applications, the sensor assembly 316 can additionally and/or alternatively include one or more GPS sensors for providing accurate and precise locational information that can be used by the individual wearing the lace adjuster 14. For example, in certain non-exclusive alternative applications, the GPS sensors can be utilized for purposes of navigation and/or the GPS sensors can be utilized for purposes of tracking. With such applications, the individual wearing the lace adjuster 14 always knows where he or she is, as well as where he or she needs to go to reach any desired destination. In such uses, the GPS sensors can be utilized to inhibit the person wearing the lace adjuster 14 from getting lost and/or to enable the wearer to follow a prescribed trail, e.g., during an adventure race or when exploring the wilderness. Moreover, as also noted above, the GPS sensors can offer a sense of security for someone, e.g., a parent or guardian, who is charged with care for and/or monitoring of the individual wearing the lace adjuster 14. In such applications, the locational information from the GPS sensors can be wirelessly transmitted to a remote device 470 (illustrated in FIG. 4) so that the user and/or the parent or guardian can always have the accurate and precise locational information of the person wearing the lace adjuster 14.

Further, the GPS sensors can be used to track the movement of the user. For example, the route ran or biked can be recorded and stored for future analysis. Other information, such as time and altitude can also be recorded and stored for future analysis.

The data that is sensed by the one or more sensors 356, as well as the data input by the athlete via the input mechanism 358 (or otherwise), can be stored and/or maintained within the storage device 360 of the sensor assembly 316. The storage device 360 can have any suitable design that enables the storing and/or maintenance of information.

The transmitter 362 can be utilized to transmit the information and data that is stored within the storage device 360 (or data from the sensors 356) to the controller 364 or other computing device, e.g., a remote smart phone, computer, etc. The transmitter 362 can have any suitable design to enable the effective transmission of information and data from the storage device 360 to the controller 364. Alternatively, the information and data that is stored within the storage device 360 can be transmitted to the controller 364 without the need for a separate transmitter 362. For example, the data can be transmitted via a removable cord to a computer or other processor.

The controller 364 is electrically coupled to the one or more sensors 356, e.g., via the storage device 360 and/or the transmitter 362. Additionally, the performance characteristics that are measured and/or sensed by the one or more sensors 356 are subsequently transmitted to and received by the controller 364 for conversion into usable statistical data, i.e. into one or more usable statistical data points. In one embodiment, one or more wires (not illustrated) can be utilized for transmitting the performance characteristics from the one or more sensors 356 to the controller 364, e.g., via the storage device 360 and/or the transmitter 362. Alternatively, in another embodiment, the one or more sensors 356 can be wirelessly coupled to the controller 364 for transmission of such performance characteristics.

As noted, the controller 364 can be utilized to convert the performance characteristics as measured and/or sensed by the sensors 356 into usable statistical data for the athlete. Such statistical data can further incorporate the data input by the athlete via the input mechanism 358 (or otherwise), and/or such statistical data can be provided independent of the data input by the athlete. The controller 364 can include one or more circuits and/or processors. Additionally, the controller 364 can include one or more program algorithms that can be effectively utilized to convert the information from the sensors 356 into the desired usable statistical data. The program algorithms can be varied depending on the particular statistical data that is desired.

As noted above, the sensor assembly 316 can be utilized to generate various types of usable statistical data to gauge the performance of the athlete. For example, the sensor assembly 316 can be utilized to generate statistical data such as can be provided through the use of a pedometer (substantially horizontal movements of the athlete), i.e. number of steps taken, total distance traveled, and/or distance traveled per step (or stride length). Stride length can obviously vary depending on the nature of the specific activity. For example, when you are tired or running uphill you have shorter strides, and when you are fresh and/or running downhill you have longer strides. By averaging such information, and comparing that to the nature of the course to be run, the user can use this information to estimate how long it will take to finish the run. With the addition of a timing sensor or mechanism, this data can be further analyzed to generate statistical data for the horizontal speed of travel.

Additionally, statistical data with regard to horizontal burst can be generated by comparing the performance characteristics that have been measured and/or sensed by two-axis accelerometers (measuring acceleration along the X axis or the Y axis, as well as the Z axis) to the performance characteristics as measured and/or sensed by the three-axis accelerometer (measuring acceleration along each of the X axis, the Y axis and the Z axis). By subtracting the two-axis data from the three-axis data, the acceleration data for the off-axis can be determined. By so isolating the acceleration data along the X axis and along the Y axis, the horizontal burst can be effectively determined. As noted above, horizontal burst can be defined as sudden acceleration from an average rate of speed (whether the athlete is already moving or is at a dead stop). Such burst can further be defined from any directional vector, north, south, east, west, and anywhere in between. Burst algorithms need to average the force expended or acceleration rate, over time.

In a substantially similar manner, the performance characteristics from the one or more sensors 356 can be utilized to generate statistical data regarding substantially vertical movements of the athlete such as a number of jumps (once characteristics of what constitutes a jump are effectively established), height of jumps, and vertical burst (i.e. take-off velocity or acceleration for a jump). For example, in order to effectively determine what may constitute a jump and the height of the jump, information from a two-axis accelerometer (i.e. along the X axis and the Y axis) would be compared to the three-axis accelerometer, so that off axis movement (or non-true movement of the foot, when calculating height) can be removed from the analysis.

The statistical data for the substantially horizontal movements of the athlete and for the substantially vertical movements of the athlete can be combined to generate additional desired statistical data, such as an overall number of accelerations (horizontal and vertical). The number of accelerations can be defined from zero momentum, to different monitoring of constant speed or a constant g range. Subsequently, a sudden increase in speed in any direction can be effectively quantified. Such information can be more valuable in certain sports that rely more on constant accelerations, such as ice hockey, or basketball.

Further, the gyrometer or other rate sensor can be utilized to analyze angular, twisting or rotational movements of the athlete. In such analysis, it may be necessary to quantify how many degrees of angular movement or rotation from true will quantify as a twist and or rotation.

Still further, as noted above, the performance characteristics that are measured and/or sensed by the one or more sensors 356 can be further utilized to generate statistical data in relation to energy expended during athletic performance (e.g., in kcal), and/or force expended during athletic performance (e.g., in psi, kpi, or other force measurements). It should be appreciated that any statistical data related to energy expended and/or force expended can require information such as the weight of the athlete in order for such statistical data to be accurately generated.

The display screen 366 can be a video screen, of any suitable size and shape, which is utilized to display any and all data and information that is sensed, input and/or generated within the sensor assembly 316. More specifically, the display device 366 can be utilized to display any performance characteristics that are measured and/or sensed by the one or more sensors 356, and data or information that is input by the athlete via the input mechanism 358 (or otherwise), and any statistical data points that may be generated from the sensed and input data by the controller 364.

The power source 368 can provide the necessary power to the one or more sensors 356, the input mechanism 358, the storage device 360, the transmitter 362, the controller 364 and/or the display screen 366 to enable all of these components to perform their desired functions. In one embodiment, the power source 368 can include one or more batteries (not shown), e.g., rechargeable batteries and/or single-use batteries, which can be used to provide such necessary power. Alternatively, the power source 368 can have another suitable design.

Figure 4:
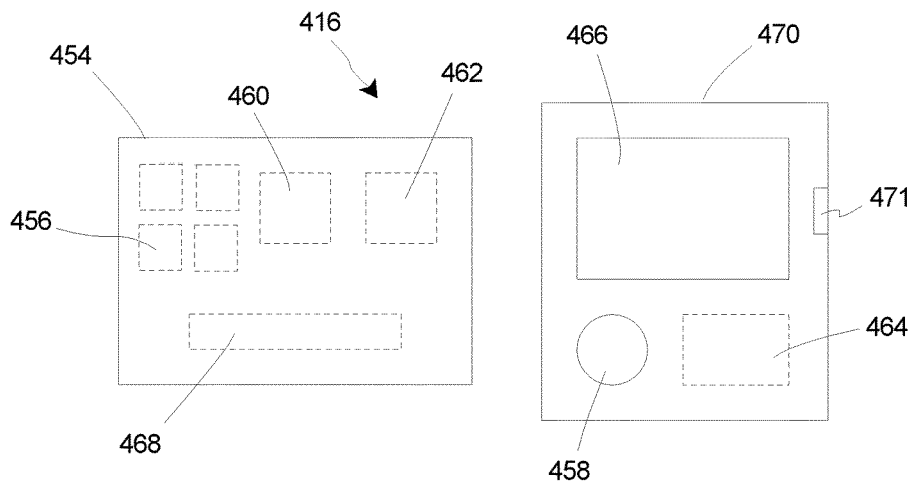
FIG. 4 is a simplified schematic illustration of another embodiment of the sensor assembly illustrated in FIG. 1.

FIG. 4 is a simplified schematic illustration of another embodiment of the sensor assembly 416 illustrated in FIG. 1. In this embodiment, the sensor assembly 416 is somewhat similar to the sensor assembly 316 illustrated and described above in relation to FIG. 3. For example, the sensor assembly 416 again includes an assembly body 454, one or more sensors 456, an input mechanism 458, a storage device 460, a transmitter 462, a controller 464, a display screen 466, and a power source 468 that are somewhat similar in design and function to the assembly body 354, the one or more sensors 356, the input mechanism 358, the storage device 360, the transmitter 362, the controller 364, the display screen 366, and the power source 368 illustrated and described above in relation to FIG. 3. Accordingly, the various features and aspects of the assembly body 454, the one or more sensors 456, the input mechanism 458, the storage device 460, the transmitter 462, the controller 464, the display screen 466, and the power source 468 will not be described in detail herein.

However, in this embodiment, as shown in FIG. 4, the input mechanism 458, the display screen 466, and the controller 464 are positioned remotely from the assembly body 454, i.e. within and/or coupled to a remote device 470. For example, the input mechanism 458, the display screen 466 and the controller 464 can be included within and/or coupled to a remote device 470 such as a smart phone, a computer, and/or any other suitable computing device. With this design, the performance characteristics that are sensed, measured and/or otherwise captured by the one or more sensors 456 can be stored within the storage device 460, and can subsequently be wirelessly transmitted, via the transmitter 462, to the controller 464 so that more usable statistical data can be generated from such performance characteristics.

In one embodiment, the remote device 470, e.g., the smart phone, includes an application for the sensor assembly 416 and the information can be uploaded to a website for analysis, comparison, storage, or other information.

In certain embodiments, the remote device 470 will have Bluetooth capabilities, and have a social media aspect where customers can communicate and compare their statistical data to one or more professional athletes. It should be appreciated that this comparison of statistical data can embody many different sports.

It should also be appreciated that by providing the display screen 466 within and/or coupled to a remote device 470 remotely from the assembly body 454, the display screen 466 can typically be larger so as to enable easier viewing of the sensed, measured, input and/or generated information, data and performance characteristics. Additionally, by providing the controller 464 within and/or coupled to a remote device 470 remotely from the assembly body 454, the controller 464 should have fewer size restrictions, and thus may be able to provide increased computation capabilities.

Additionally, as noted herein above, in certain embodiments, the remote device 470 can include a USB port 471 or other suitable connection that enables the user to simply plug the storage device 460 into the USB port 471 to quickly and easily download any and all data generated through use of the sensor assembly 416. With such design, the user is able to view any and all such data at a later time of convenience to the user.

Figure 5:
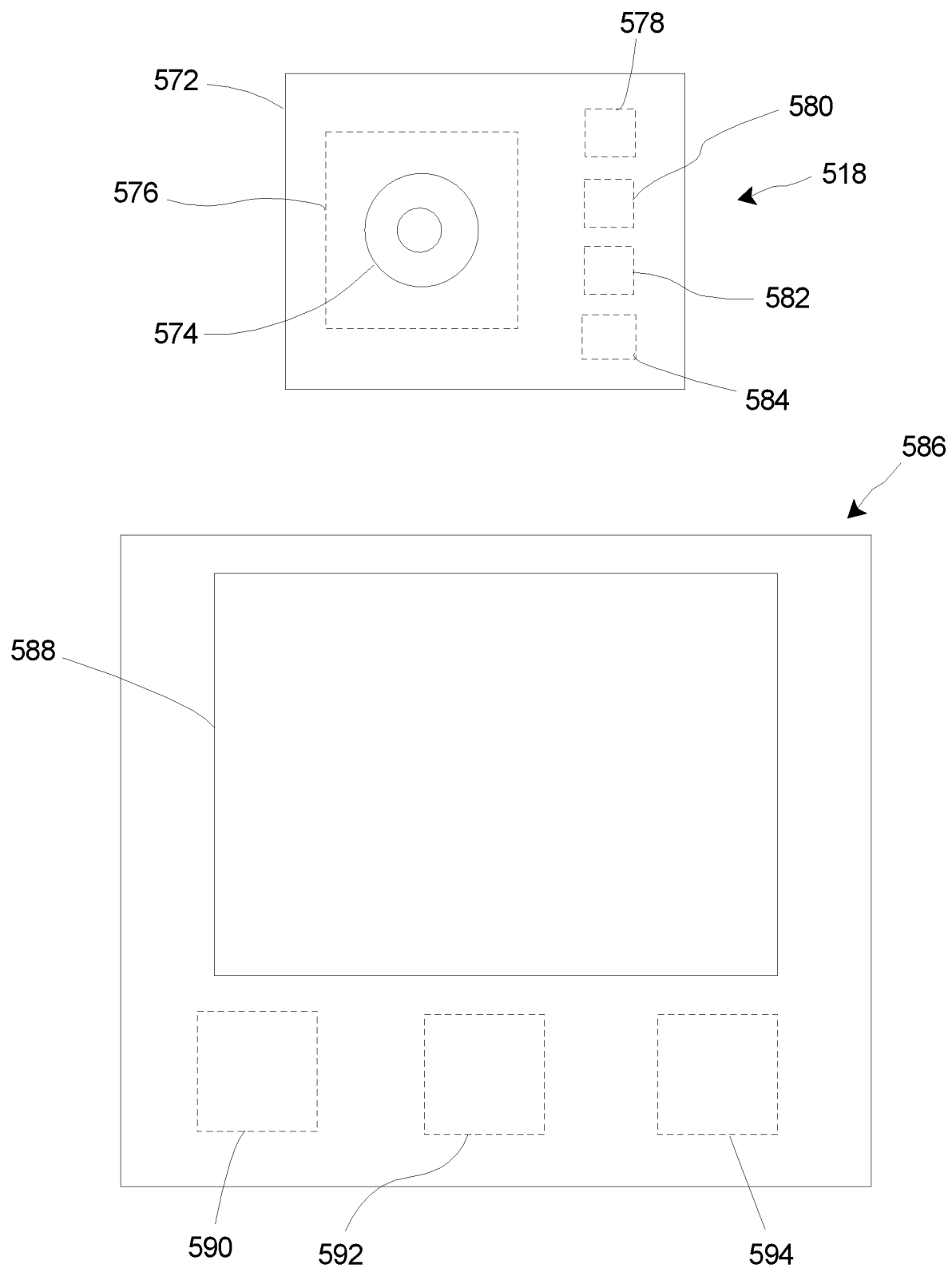
FIG. 5 is a simplified schematic illustration of an embodiment of the image capturing assembly illustrated in FIG. 1.

FIG. 5 is a simplified schematic illustration of an embodiment of the image capturing assembly 518 illustrated in FIG. 1. The design of the image assembly 518 can be varied. For example, as illustrated in FIG. 5, the image assembly 518 can be a digital camera that includes an assembly body 572, an optical assembly 574, a capturing system 576 (illustrated in phantom), a storage device 578 (illustrated as a box in phantom), a transmitter 580 (illustrated as a box in phantom), a controller 582 (illustrated as a box in phantom), and a power source 584 (illustrated as a box in phantom). The design of these components can be varied to suit the design requirements and type of image assembly 518. Alternatively, the image assembly 518 can be designed without one or more of these components.

Additionally, in certain alternative embodiments, the image assembly 518 can be designed to capture still images of the athlete during an athletic performance, and/or the image assembly 518 can be designed to capture video image sequences of the athlete during an athletic performance. Further, in some embodiments, the image assembly 518 can be activated manually by the athlete or other user of the image assembly 518, and/or the image assembly 518 can be designed to be automatically activated based on the occurrence of certain movements or events.

As shown in this embodiment, each of the optical assembly 574, the capturing system 576, the storage device 578, the transmitter 580, the controller 582 and the power source 584 can be coupled to and/or positioned substantially within the assembly body 572. Alternatively, one or more of the components can be provided remotely from the assembly body 572.

The assembly body 572 can be rigid and support and/or provide a housing for at least some of the other components of the image assembly 518, e.g., the optical assembly 574, the capturing system 576, the storage device 578, the transmitter 580, the controller 582 and the power source 584. In one embodiment, the assembly body 572 includes a generally rectangular shaped hollow body that forms a cavity that receives and retains such components of the image assembly 518.

The optical assembly 574 can include a single lens or a combination of lenses that work in conjunction with each other to focus light onto the capturing system 576. As the image assembly 518 is coupled to the lace adjuster 14, the optical assembly 574 can be positioned and oriented such that the lenses focus light onto the capturing system 576 from any desired direction. For example, in one embodiment, the optical assembly 574 can be positioned and oriented such that the lenses focus light onto the capturing system 576 from a generally vertical direction, i.e. the optical assembly 574 is directed in a generally upward direction from the lace adjuster 14. Additionally and/or alternatively, the optical assembly 574 can be positioned and oriented such that the lenses focus light onto the capturing system 576 from a generally horizontal direction and/or at any desired angle between the vertical and horizontal directions.

In one embodiment, the image assembly 518 includes an autofocus assembly (not shown) including one or more lens movers that move one or more lenses of the optical assembly 574 in or out until the sharpest possible image of a main subject, e.g., the athlete, is received by the capturing system 576.

The capturing system 576 captures information for the still images and/or the video sequences of the athlete during their athletic performance. The design of the capturing system 576 can vary according to the type of image assembly 518. For a digital-type camera, the capturing system 576 can include an image sensor (not shown) and a filter assembly (not shown).

The still images and/or video sequences that are captured by the capturing system 576 can be stored and/or maintained within the storage device 578 of the image assembly 518. The storage device 578 can have any suitable design that enables the storing of such still images and/or video sequences.

The transmitter 580 can be utilized to transmit the still images and/or video sequences that are stored within the storage device 578 to the controller 582 and/or to a remote image device 586, e.g., a television, a smart phone, a computer, etc. The transmitter 580 can have any suitable design to enable the effective transmission of the still images and/or video sequences from the storage device 578 to the controller 582 and/or to the remote image device 586. Alternatively, the still images and/or video sequences that are stored within the storage device 578 can be transmitted to the controller 582 without the need for a separate transmitter 580.

The controller 582 is electrically connected to and controls the operation of the electrical components of the image assembly 518. The controller 582 can include one or more processors and circuits, and the controller 582 can be programmed to perform one or more of the functions described herein. For example, the controller 582 can be utilized to perform various processing steps on the still images and/or video sequences of the athlete that have been captured by the capturing system 576.

As shown, the controller 582 can be positioned within the assembly body 572. Additionally and/or alternatively, the controller 582 and/or a separate, second controller can be positioned remotely from the image assembly 518, e.g., within the remote image device 586.

The power source 584 can provide the necessary power to the optical assembly 574, the capturing system 576, the storage device 578, the transmitter 580 and/or the controller 582 to enable all of these components to perform their desired functions. In one embodiment, the power source 584 can include one or more batteries (not shown), e.g., rechargeable batteries and/or single-use batteries, which can be used to provide such necessary power. Alternatively, the power source 584 can have another suitable design.

It should be appreciated that in embodiments of the lace adjuster assembly 12 that include both the image assembly 518 and the sensor assembly 316, the transmitter 580, the controller 582 and/or the power source 584 can be used in common for each of the image assembly 518 and the sensor assembly 316. Alternatively, in such embodiments, the image assembly 518 and the sensor assembly 316 can include and utilize separate transmitters, controllers and/or power sources.

Further, in one embodiment of the lace adjuster assembly 12 that includes both the image assembly 518 and the sensor assembly 316, the various components of the image assembly 518 and the sensor assembly 316 can be coupled to and/or positioned substantially within a common assembly body.

Additionally, as shown in FIG. 5 and as noted above, the image assembly 518 can be wirelessly coupled to the remote image device 586. For example, in certain embodiments, the transmitter 580 of the image assembly 518 can be designed to wirelessly transmit the still images and video sequences of the athlete to the remote image device 586 via Wi-Fi, Bluetooth, or other suitable wireless technique.

The design of the remote image device 586 can be varied. As shown in this embodiment, the remote image device 586 can include an image display screen 588, a remote storage device 590 (illustrated as a box in phantom), a remote device controller 592 (illustrated as a box in phantom), and a remote device power source 594 (illustrated as a box in phantom). Alternatively, the remote image device 586 can be designed with greater or fewer components than those specifically illustrated and described herein. In certain non-exclusive alternative embodiments, the remote image device 586 can comprise a television, a smart phone, a computer, and/or any other suitable device for displaying the still images and/or video sequences of the athlete. For example, in some such embodiments, the still images and/or video sequences can be viewed or displayed on television, on a website (after proper uploading), and/or via a smart phone app.

The image display screen 588 is provided for purposes of viewing the still images and/or video sequences of the athlete that have been captured by the image assembly 518 during the athletic performance. It should be appreciated that by providing the image display screen 588 within and/or coupled to the remote image device 586 remotely from the assembly body 572, the image display screen 588 can typically be substantially larger so as to enable easier viewing of the still images and/or video sequences of the athlete that have been captured by the image assembly 518 during the athletic performance.

The remote storage device 590 and the remote device controller 592 can be designed to perform essentially the same functions as the storage device 578 and the controller 582 that are coupled to or positioned substantially within the assembly body 572 of the image assembly 518. Additionally, by providing the remote storage device 590 and the remote device controller 592 within and/or coupled to the remote image device 586 remotely from the assembly body 572, the remote storage device 590 and the remote device controller 592 should have fewer size restrictions, and thus may be able to provide increased image storage and image processing capabilities.

In certain embodiments, the still images and/or video sequences of the athlete can be shown live on the image display screen 588 of the remote image device 586, and/or such still images and video sequences can be saved on the remote storage device 590 for future viewing.

The remote device power source 594 can provide the necessary power to the image display screen 588, the remote storage device 590 and/or the remote device controller 592 to enable all of these components to perform their desired functions. In one embodiment, the remote device power source 594 can include one or more batteries (not shown), e.g., rechargeable batteries and/or single-use batteries, which can be used to provide such necessary power. Alternatively, the remote device power source 594 can have another suitable design.

Figure 6A:
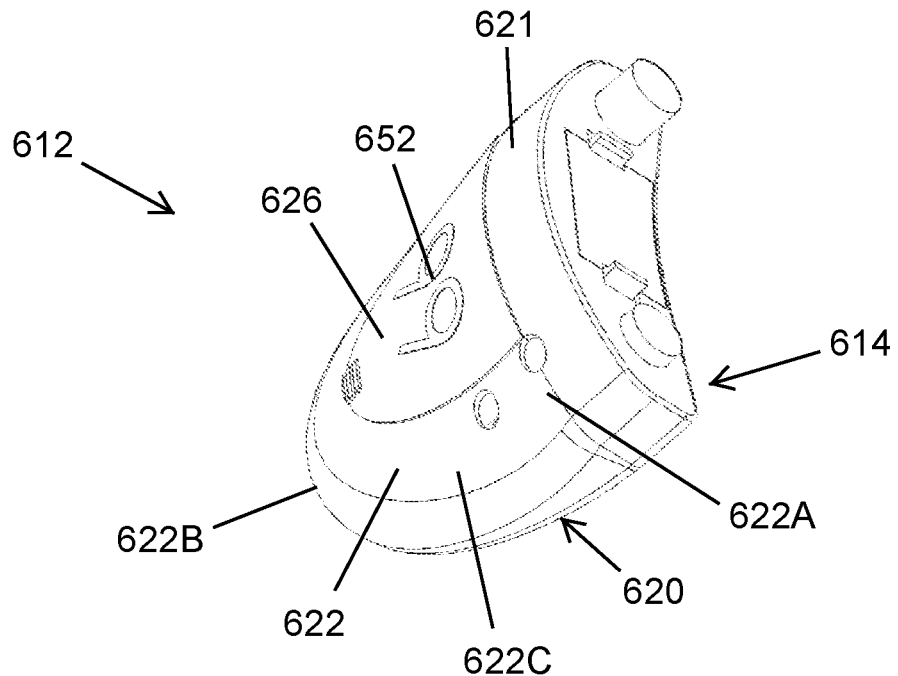
FIG. 6A is a perspective view of another embodiment of a lace adjuster assembly having features of the present invention.
Figure 6B:
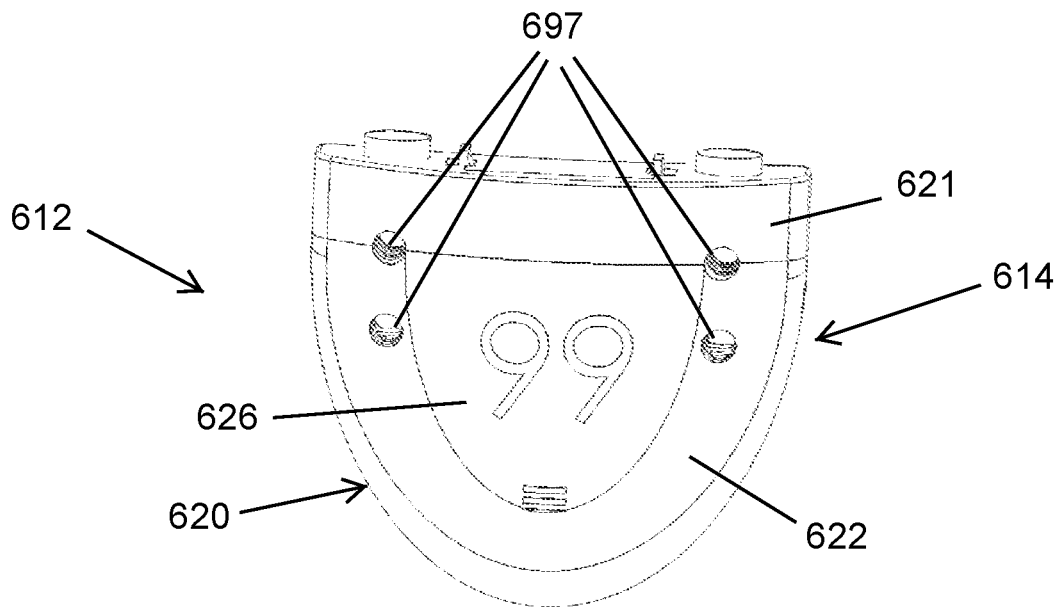
FIG. 6B is a front view of the lace adjuster assembly illustrated in FIG. 6A, the lace adjuster assembly including a lace adjuster that is in an unlocked configuration.
Figure 6C:
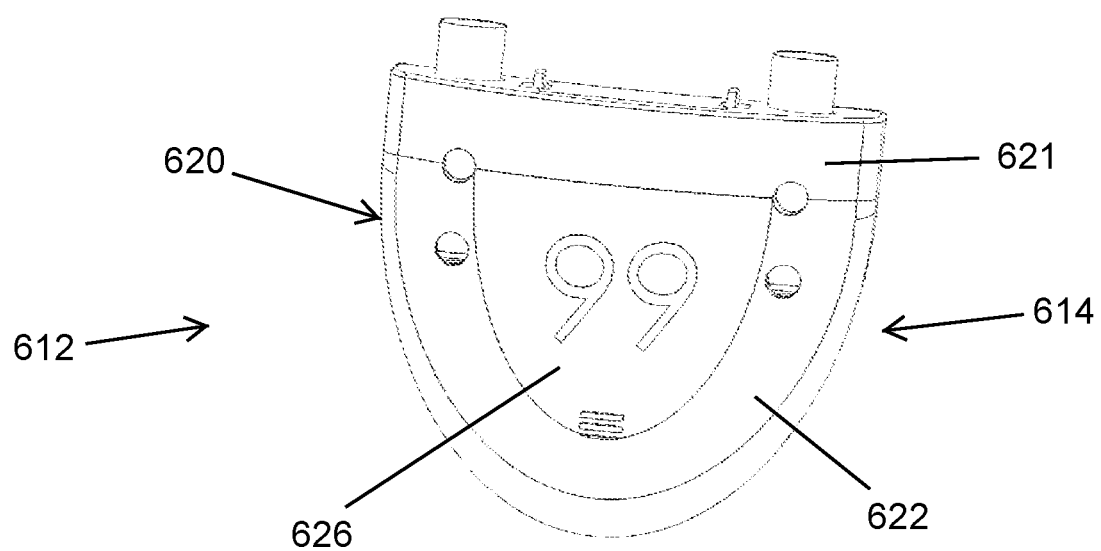
FIG. 6C is a front view of the lace adjuster assembly illustrated in FIG. 6A, the lace adjuster being in a locked configuration.
Figure 6D:
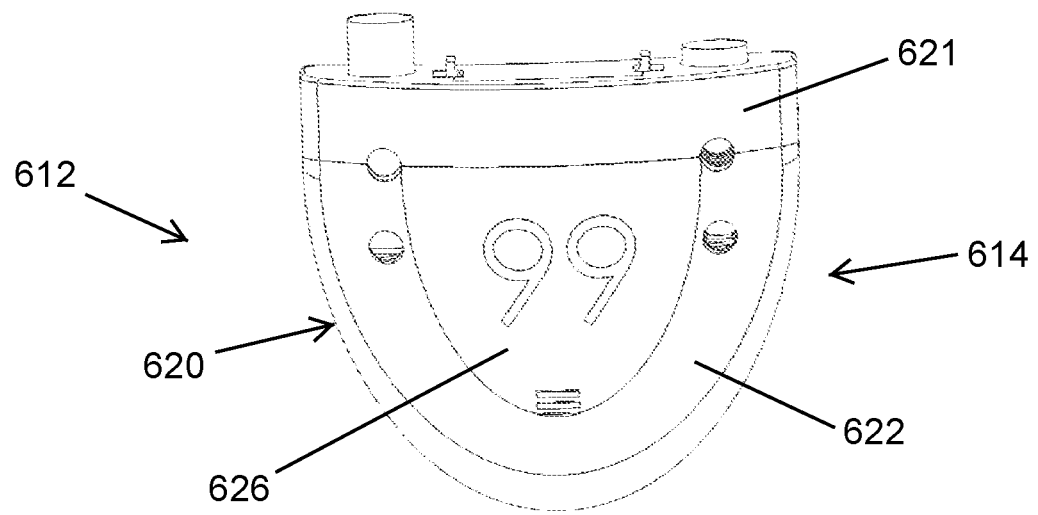
FIG. 6D is a front view of the lace adjuster assembly illustrated in FIG. 6A, the lace adjuster being in a partially locked configuration.
Figure 6E:
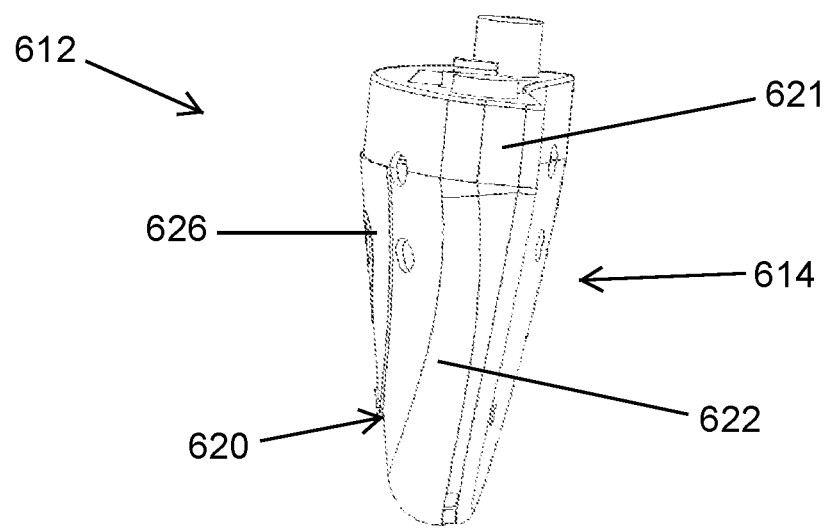
FIG. 6E is a side view of the lace adjuster assembly illustrated in FIG. 6A.
Figure 6F:
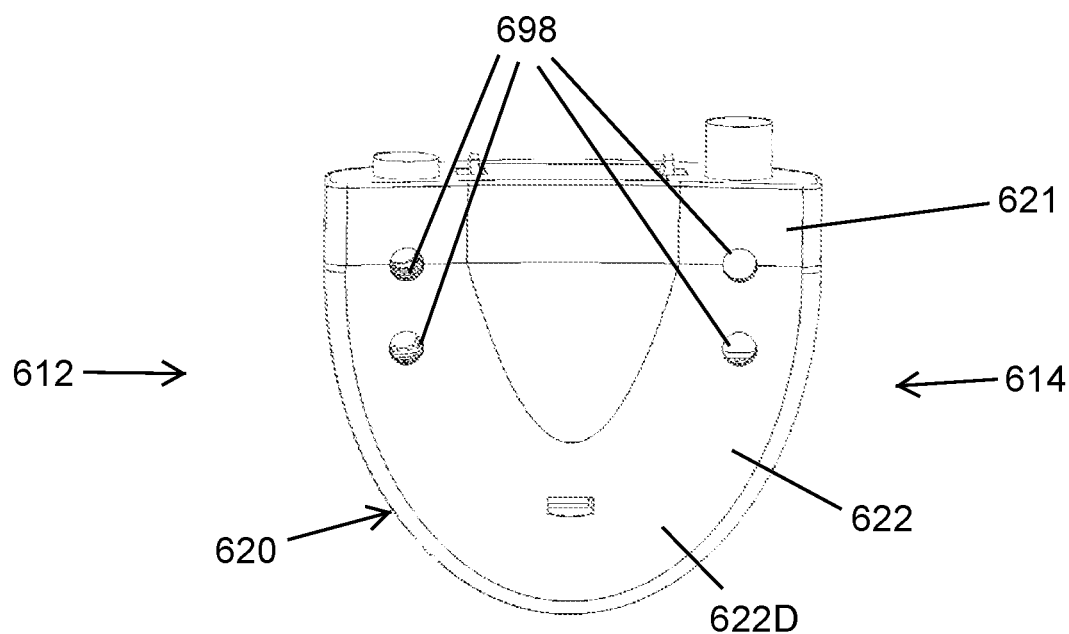
FIG. 6F is a back view of the lace adjuster assembly illustrated in FIG. 6A.
Figure 6G:
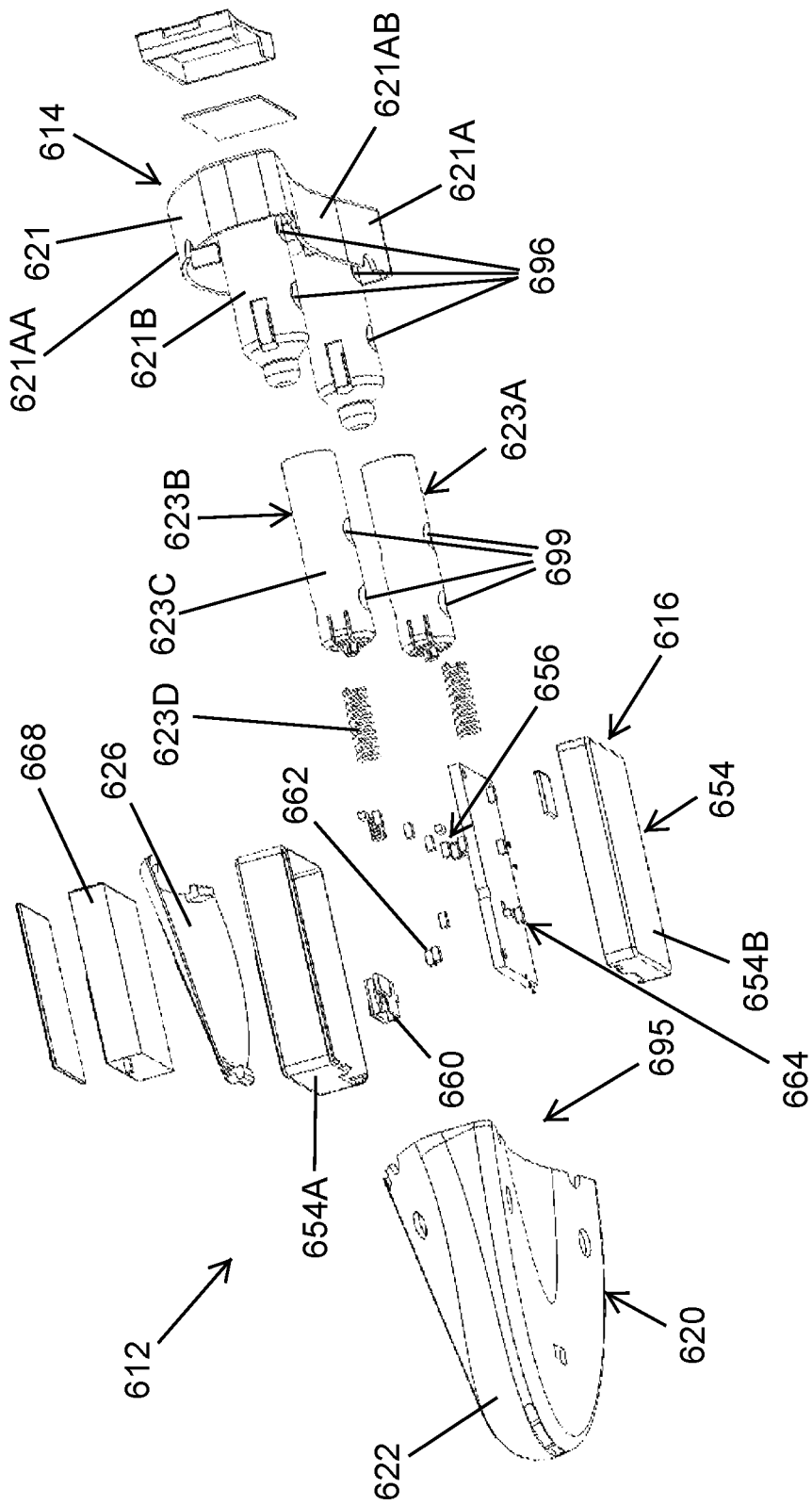
FIG. 6G is an exploded view of the lace adjuster assembly illustrated in FIG. 6A.

FIGS. 6A-6G are alternative views of another embodiment of a lace adjuster assembly 612 having features of the present invention. In particular, FIG. 6A is a perspective view of another embodiment of a lace adjuster assembly 612 having features of the present invention; FIG. 6B is a front view of the lace adjuster assembly 612 illustrated in FIG. 6A, the lace adjuster assembly 612 including a lace adjuster 614 that is in an unlocked configuration; FIG. 6C is a front view of the lace adjuster assembly 612 illustrated in FIG. 6A, the lace adjuster 614 being in a locked configuration; FIG. 6D is a front view of the lace adjuster assembly 612 illustrated in FIG. 6A, the lace adjuster 614 being in a partially locked configuration; FIG. 6E is a side view of the lace adjuster assembly 612 illustrated in FIG. 6A; FIG. 6F is a back view of the lace adjuster assembly 612 illustrated in FIG. 6A; and FIG. 6G is an exploded view of the lace adjuster assembly 612 illustrated in FIG. 6A.

The design of the lace adjuster assembly 612 can be varied. In the embodiment illustrated in FIGS. 6A-6G, the lace adjuster assembly 612 includes a lace adjuster 614 and a sensor assembly 616 (illustrated in FIG. 6G) that is coupled to and/or secured within the lace adjuster 614. Additionally and/or alternatively, the lace adjuster assembly 612 can have more components or fewer components than those specifically illustrated and described herein. For example, in certain non-exclusive alternative embodiments, the lace adjuster assembly 612 can further include an image capturing assembly (similar to what was illustrated and described herein above) that is coupled to the lace adjuster 614 in any suitable manner and/or the lace adjuster assembly 612 can be designed without the sensor assembly 616.

As above, the lace adjuster 614 can be used to easily and quickly tighten or loosen the shoelace 11 (illustrated in FIG. 1) of the shoe 10 (illustrated in FIG. 1). As shown in FIGS. 6A-6G, the lace adjuster 614 comprises an adjuster body assembly 620 (also referred to herein simply as a "body assembly") including a first body member 621 and a second body member 622, a first resilient insert assembly 623A (illustrated in FIG. 6G), a second resilient insert assembly 623B (illustrated in FIG. 6G), and an adjuster cover plate 626. The design and positioning of each of the components of the lace adjuster 614 can be varied pursuant to the teachings provided herein. Additionally, the lace adjuster 614 can be designed without one or more of the components as listed above. For example, the lace adjuster 614 can be designed without the adjuster cover plate 626.

As with the previous embodiments, the lace adjuster 614 is configured to be selectively moved between an unlocked configuration (as illustrated, for example, in FIG. 6B) and a locked configuration (as illustrated, for example, in FIG. 6C). Additionally, in this embodiment, the lace adjuster 614 can be positioned in a partially locked configuration (as illustrated, for example, in FIG. 6A and FIGS. 6D-6F). More specifically, in this embodiment, each of the resilient insert assemblies 623A, 623B can be moved independently of one another between a locked position and an unlocked position, such that the shoelace 11 can be selectively adjusted independently on each side. For example, in each of FIGS. 6A and 6D-6F, the first resilient insert assembly 623A is in the locked position and the second resilient insert assembly 623B is in the unlocked position.

In this embodiment, the first body member 621 and the second body member 622 of the body assembly 620 are selectively coupled together to form a cavity 695 (illustrated in FIG. 6G) therein, with the sensor assembly 616 being secured within the cavity 695.

Referring now to FIG. 6G, in this embodiment, the first body member 621 includes a member base 621A and a pair of substantially cylinder-shaped member projections 621B that cantilever away from an inner surface of the member base 621A into the cavity 695. As shown, the member base 621A includes a base front 621AA that is a rounded, semi-oval shape, and a base back 621AB that is substantially flat or slightly curved, wherein the base back 621AB is designed to face the shoe 10 and rest stably against the shoe 10.

Additionally, as shown, each of the member projections 621B includes a pair of projection apertures 696 that extend fully through the member projections 621B. The projection apertures 696 are adapted to receive and retain a portion of the shoelace 11 during use, as will be described in greater detail herein below.

Referring back now to FIG. 6A, the second body member 622 can be substantially semi-oval-shaped, with a substantially flat top side 622A that is designed to directly abut a portion of the first body member 621, and a rounded bottom side 622B. Additionally, the second body member 622 can also include a front side 622C that is a rounded, semi-oval shape to match the base front 621AA of the member base 621A, and a back side 622D (illustrated more clearly in FIG. 6F) that is substantially flat or slightly curved to match the base back 621AB of the member base 621A, wherein the back side 622D is designed to face the shoe 10 and rest stably against the shoe 10.

Further, as shown in the Figures, the body assembly 620 includes a plurality of front body apertures 697 (four are illustrated, for example, in FIG. 6B) and a plurality of back body apertures 698 (four are illustrated in FIG. 6F). The body assembly 620 is configured such that the front body apertures 697 are aligned with the back body apertures 698 when the body members 621, 622 are coupled together. Additionally, the projection apertures 696 are also aligned with the front body apertures 697 and the back body apertures 698 when the body members 621, 622 are coupled together.

It should be appreciated that the number of front body apertures 697 and back body apertures 698 can be varied. Stated in another manner, the body assembly 620 can include greater than four or less than four front body apertures 697, and/or the body assembly 620 can include greater than four or less than four back body apertures 698.

As noted above, the resilient insert assemblies 623A, 623B are adapted to be selectively and independently moved between a locked position and an unlocked position, so as to move the lace adjuster 614 between the locked configuration and the unlocked configuration. The design of the resilient insert assemblies 623A, 623B can be varied to suit the requirements of the lace adjuster 614. In certain embodiments, as shown in FIG. 6G, the resilient insert assemblies 623A, 623B can be substantially identical to one another, and can include a substantially cylinder-shaped assembly shaft 623C and a resilient member 623D that is coupled to the assembly shaft 623C.

The assembly shaft 623C is sized and shaped to fit within and move within the member projection 621B. As shown in FIG. 6G, each of the assembly shafts 623C includes a pair of shaft apertures 699 that extend fully through the assembly shafts 623C.

As provided herein, when the resilient insert assembly 623A, 623B is in the unlocked position, the shaft apertures 699 are substantially aligned with the front body apertures 697, the back body apertures 698 and the projection apertures 696, such that the shoelace 11 can be easily and effectively threaded fully through and/or removed from the front body apertures 697, the back body apertures 698, the projection apertures 696 and the shaft apertures 699. Conversely, when the resilient insert assembly 623A, 623B is in the locked position, the shaft apertures 699 are not aligned with the front body apertures 697, the back body apertures 698 and the projection apertures 696, such that the shoelace 11 cannot be easily moved through the apertures. Thus, when the shoelace 11 has been threaded through the apertures, one or both of the resilient insert assemblies 623A, 623B can be moved to the locked position so that the shoelace 11 is effectively retained in position.

The resilient member 623D of each of the resilient insert assemblies 623A, 623B is coupled to and extends between the assembly shaft 623C and a portion of the second body member 622. The design of the resilient member 623D can be varied depending on the requirements of the lace adjuster 614. For example, as shown in FIG. 6G, the resilient member 623D is a spring. Alternatively, the resilient member 623D can be another piece of resilient material. In one embodiment, the resilient member 623D urges the assembly shaft 623C into the locked position. Stated in another manner, the resilient member 623D biases the assembly shaft 623C to the locked position. Alternatively, the resilient member 623D can be designed to urge the assembly shaft 623C to the unlocked position. In such alternative embodiment, the lace adjuster 614 would further require a locking mechanism (not illustrated) that would maintain the assembly shaft 623C in the locked position. In these alternative embodiments, the resilient member 623D is either extended or compressed as the assembly shaft 623C is moved between the locked position and the unlocked position.

The adjuster cover plate 626 can be coupled to the body assembly 620. Additionally, the adjuster cover plate 620 can include a design 652 so as to give the lace adjuster 614 a more interesting appearance.

Referring again to FIG. 6G, the sensor assembly 616 is clearly illustrated as able to fit and be secured within the cavity 695 formed between the first body member 621 and the second body member 622. The design of the sensor assembly 616 can be varied. It should be appreciated that the sensor assembly 616 can be designed in a somewhat similar manner to the sensor assemblies 316, 416 illustrated and described herein above. For example, in the embodiment shown in FIG. 6G, the sensor assembly 616 includes an assembly body 654 (e.g., a first housing member 654A and a second housing member 654B), one or more sensors 656, a storage device 660, a transmitter 662, a controller 664 and a power source 668 that are somewhat similar in design and function to the similarly-named components illustrated and described above. Thus, a detailed description of such components will not be repeated here. Additionally, similar to the embodiment illustrated in FIG. 4, a display screen 466 (shown in FIG. 4) and an input mechanism 458 (shown in FIG. 4) can be included within a remote device 470 (shown in FIG. 4) so as to provide certain benefits in size and complexity.

Figure 7A:
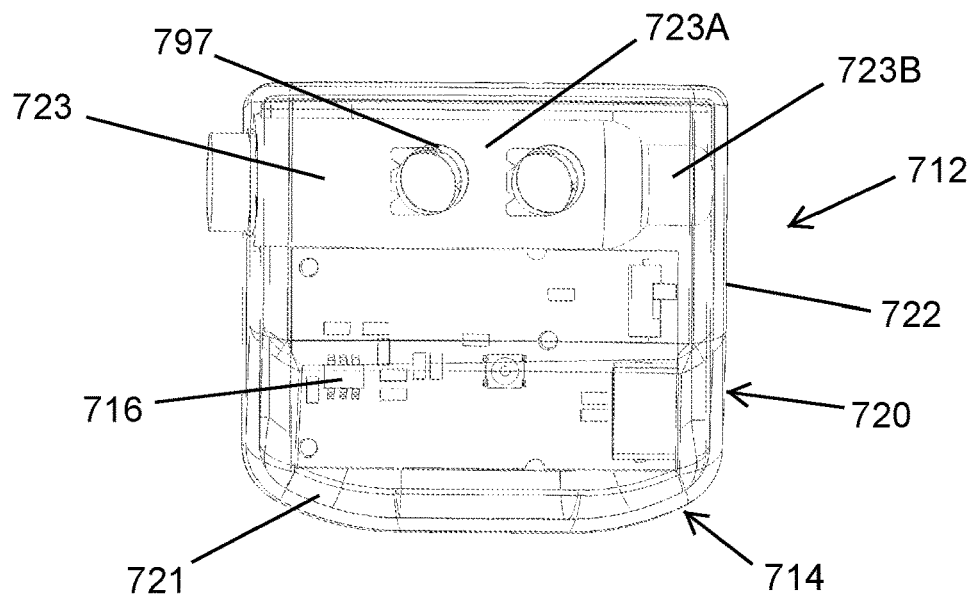
FIG. 7A is a front perspective view of still another embodiment of a lace adjuster assembly having features of the present invention, the lace adjuster assembly including a lace adjuster that is in the unlocked configuration.

FIG. 7A is a front perspective view of still another embodiment of a lace adjuster assembly 712 having features of the present invention. The design of the lace adjuster assembly 712 can be varied. In the embodiment illustrated in FIG. 7A, the lace adjuster assembly 712 includes a lace adjuster 714 and a sensor assembly 716 (illustrated in FIG. 7D) that is coupled to and/or secured within the lace adjuster 714. Additionally and/or alternatively, the lace adjuster assembly 712 can have more components or fewer components than those specifically illustrated and described herein. For example, in certain non-exclusive alternative embodiments, the lace adjuster assembly 712 can further include an image capturing assembly (not shown) that is coupled to the lace adjuster 714 in any suitable manner and/or the lace adjuster assembly 712 can be designed without the sensor assembly 716.

As above, the lace adjuster 714 can be used to easily and quickly tighten or loosen the shoelace 11 (illustrated in FIG. 1) of the shoe 10 (illustrated in FIG. 1). In certain embodiments, the lace adjuster 714 includes an adjuster body assembly 720 (also referred to herein simply as a "body assembly") including a first body member 721 and a second body member 722 (illustrated more clearly in FIG. 7B), and a resilient insert assembly 723. The design and positioning of each of the components of the lace adjuster 714 can be varied pursuant to the teachings provided herein. Additionally and/or alternatively, the lace adjuster 714 can be designed with more or fewer components than those listed above.

In the embodiment illustrated in FIG. 7A, the first body member 721 is illustrated as being transparent, such that the sensor assembly 716 can be easily seen from outside the lace adjuster 714. With such design, the lace adjuster 714 can further include an image assembly (not shown) that is also retained within the body assembly 720. Additionally and/or alternatively, the second body member 722 can also be transparent, or the body assembly 720 can be designed such that neither body member 721, 722 is transparent.

As with the previous embodiments, the lace adjuster 714 is configured to be selectively moved between an unlocked configuration (as illustrated, for example, in FIGS. 7A and 7B) were that laces are free to move and a locked configuration (as illustrated, for example, in FIG. 7C) where the laces are locked. It should be noted that in certain embodiments, the end of the laces are not retained. However, the embodiment illustrated in FIG. 7A can be modified to retain the ends of the laces.

In certain embodiments, the first body member 721 and the second body member 722 of the body assembly 720 are selectively coupled together to form a cavity (not shown) therein, with the sensor assembly 716 being secured within the cavity.

Additionally, as shown in FIG. 7A, the body assembly 720, i.e. the first body member 721 includes a plurality of front body apertures 797 (two are illustrated in FIG. 7A). It should be appreciated that the number of front body apertures 797 can be varied. Stated in another manner, the first body member 721 can include greater than two or less than two front body apertures 797.

Figure 7B:
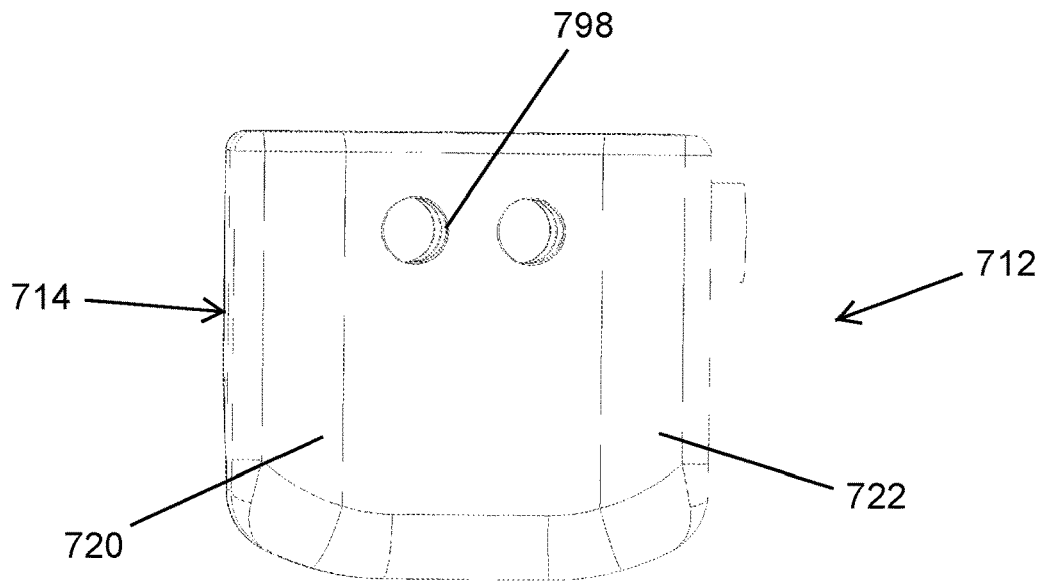
FIG. 7B is a back perspective view of the lace adjuster assembly illustrated in FIG. 7A, the lace adjuster being in the unlocked configuration.

FIG. 7B is a back perspective view of the lace adjuster assembly 712 illustrated in FIG. 7A. As shown, the lace adjuster 714 is again in the unlocked configuration. Additionally, as shown in FIG. 7B, the body assembly 720, i.e. the second body member 722, includes a plurality of back body apertures 798 (two are illustrated in FIG. 7B). The body assembly 720 is configured such that the front body apertures 797 are aligned with the back body apertures 798 when the body members 721, 722 are coupled together. It should be appreciated that the number of back body apertures 798 can be varied. Stated in another manner, the second body member 722 can include greater than two or less than two back body apertures 798.

Figure 7C:
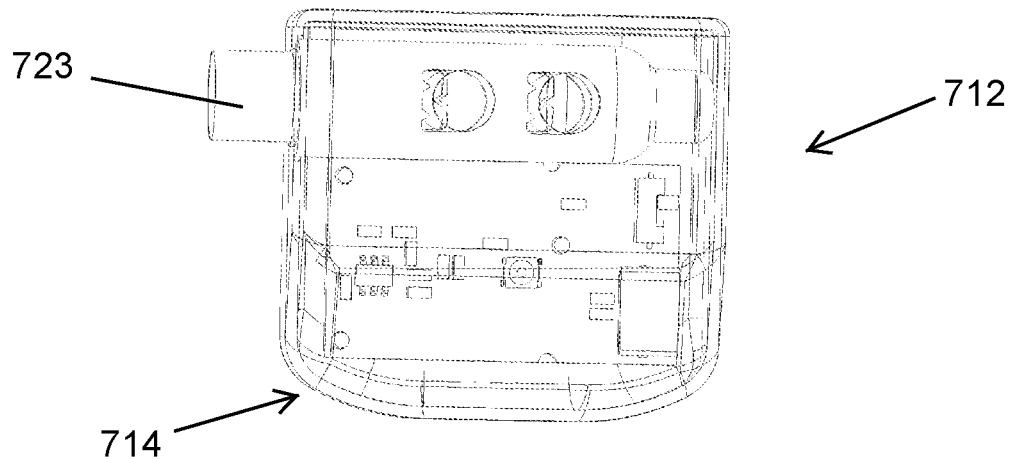
FIG. 7C is a front perspective view of the lace adjuster assembly illustrated in FIG. 7A, the lace adjuster being in the locked configuration.

As noted above, FIG. 7A illustrates the lace adjuster 714 in the unlocked configuration. Additionally, FIG. 7C is a front perspective view of the lace adjuster assembly 712 illustrated in FIG. 7A, with the lace adjuster 714 being in the locked configuration. As illustrated, the resilient insert assembly 723 is adapted to be selectively moved between an unlocked position (illustrated in FIG. 7A) and a locked position (illustrated in FIG. 7C), so as to move the lace adjuster 714 between the unlocked configuration and the locked configuration.

Figure 7D:
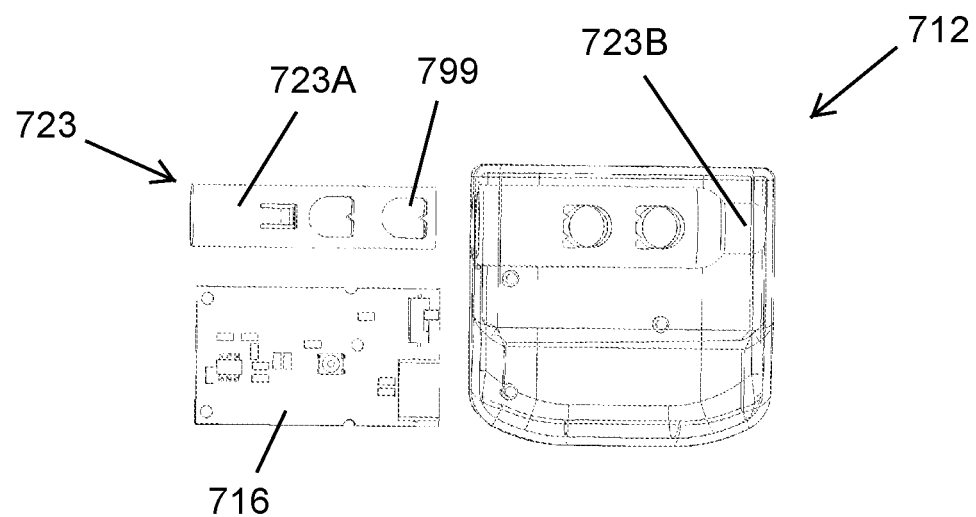
FIG. 7D is a partially exploded view of the lace adjuster assembly illustrated in FIG. 7A.

Further, FIG. 7D is a partially exploded view of the lace adjuster assembly 712 illustrated in FIG. 7A.

The design of the resilient insert assembly 723 can be varied to suit the requirements of the lace adjuster 714. In certain embodiments, the resilient insert assembly 723 can include a substantially cylinder-shaped (or other shape) assembly shaft 723A and a resilient member 723B that is coupled to the assembly shaft 723A. As shown in FIG. 7D, the assembly shaft 723A can include a plurality of shaft apertures 799 (two are illustrated in FIG. 7D). It should be appreciated that the number of shaft apertures 799 can be varied. Stated in another manner, the assembly shaft 723A can include greater than two or less than two shaft apertures 799.

Additionally, it should be appreciated that the shape of the shaft apertures 799 can be varied as desired. For example, as shown, the shaft apertures 799 can include one or more tooth-shaped projections that can be utilized to more effectively retain the shoelace 11 (illustrated in FIG. 1) when the lace adjuster 714 is in the locked configuration. Alternatively, the shaft apertures 799 can have another suitable design.

As provided herein, when the resilient insert assembly 723 is in the unlocked position, the shaft apertures 799 are substantially aligned with the front body apertures 797 and the back body apertures 798, such that the shoelace 11 (illustrated in FIG. 1) can be easily and effectively threaded fully through and/or removed from the front body apertures 797, the back body apertures 798, and the shaft apertures 799. Conversely, when the resilient insert assembly 723 is in the locked position, the shaft apertures 799 are not aligned with the front body apertures 797 and the back body apertures 798, such that the shoelace 11 cannot be easily moved through the apertures. Thus, when the shoelace 11 has been threaded through the apertures, the resilient insert assembly 723 can be moved to the locked position so that the shoelace 11 is effectively retained in position.

The resilient member 723B of the resilient insert assembly 723 is coupled to and extends between the assembly shaft 723A and a portion of the body assembly 720. The design of the resilient member 723B can be varied depending on the requirements of the lace adjuster 714. For example, in certain embodiments, the resilient member 723B is a spring. Alternatively, the resilient member 723B can be another piece of resilient material. In one embodiment, the resilient member 723B urges the assembly shaft 723A into the locked position. Stated in another manner, the resilient member 723B biases the assembly shaft 723A to the locked position. Alternatively, the resilient member 723B can be designed to urge the assembly shaft 723A to the unlocked position. In such alternative embodiment, the lace adjuster 714 would further require a locking mechanism (not illustrated) that would maintain the assembly shaft 723A in the locked position. In these alternative embodiments, the resilient member 723B is either extended or compressed as the assembly shaft 723A is moved between the locked position and the unlocked position.

Referring again to FIG. 7A, the sensor assembly 716 is clearly illustrated as able to fit and be secured within the cavity formed between the first body member 721 and the second body member 722. The design of the sensor assembly 716 can be varied. It should be appreciated that the sensor assembly 716 can be designed in a substantially similar manner to the sensor assemblies 316, 416 illustrated and described herein above. Thus, a detailed description of the various components of the sensor assembly 716 will not be repeated here. Additionally, similar to the embodiment illustrated in FIG. 4, the sensor assembly 716 can be used with a remote device 470 (shown in FIG. 4) so as to provide certain benefits in size and complexity.

It is understood that although a number of different embodiments of the lace adjuster assembly 12, i.e. of the lace adjuster 14, the sensor assembly 16 and the image assembly 18, have been illustrated and described herein, one or more features of any one embodiment can be combined with one or more features of one or more of the other embodiments, provided that such combination satisfies the intent of the present invention.

While a number of exemplary aspects and embodiments of a lace adjuster assembly 12, i.e. a lace adjuster 14, a sensor assembly 16 and an image assembly 18, have been shown and disclosed herein above, those of skill in the art will recognize certain modifications, permutations, additions and sub-combinations thereof. It is therefore intended that the lace adjuster 14, the sensor assembly 16 and the image assembly 18 shall be interpreted to include all such modifications, permutations, additions and sub-combinations as are within their true spirit and scope, and no limitations are intended to the details of construction or design herein shown.

What is claimed is:

1. A lace adjuster assembly for selectively adjusting a shoelace of a shoe of a user, the lace adjuster assembly comprising:
a lace adjuster that is adapted to allow the user to selectively adjust the shoelace of the shoe of the user, the lace adjuster including a body assembly having a first body member and a second body member that is movably coupled to the first body member, the lace adjuster being selectively movable between an unlocked configuration and a locked configuration, wherein the shoelace is adjustable relative to the lace adjuster when the lace adjuster is in the unlocked configuration, and wherein the shoelace is resiliently retained by the lace adjuster and is inhibited from being adjusted relative to the lace adjuster when the lace adjuster is in the locked configuration; and
a sensor assembly that is mechanically coupled to the lace adjuster, the sensor assembly including (i) a first sensor that senses a first performance characteristic of the user during an athletic performance, and (ii) a storage device that is configured to store the first performance characteristic sensed by the first sensor;
wherein the first sensor and the storage device are positioned within the body assembly of the lace adjuster.

2. The lace adjuster assembly of claim 1 wherein the sensor assembly further includes a controller that is electrically connected to the first sensor, the controller including a processor; and wherein the controller receives the first performance characteristic from the first sensor and generates a first statistical data point based at least in part on the first performance characteristic.

3. The lace adjuster assembly of claim 2 wherein the sensor assembly further includes a second sensor that is positioned within the body assembly of the lace adjuster.

4. The lace adjuster assembly of claim 3 wherein the second sensor senses a second performance characteristic of the user during the athletic performance; and wherein the storage device is configured to store the second performance characteristic sensed by the second sensor.

5. The lace adjuster assembly of claim 4 wherein the controller further receives the second performance characteristic from the second sensor and generates the first statistical data point based at least in part on the first performance characteristic and the second performance characteristic.

6. The lace adjuster assembly of claim 4 wherein the controller further receives the second performance characteristic from the second sensor and generates a second statistical data point based at least in part on the second performance characteristic.

7. The lace adjuster assembly of claim 3 wherein the second sensor is a GPS sensor that is mechanically coupled to the lace adjuster, the GPS sensor being configured for providing locational information of the user; and wherein the storage device is configured to store the locational information sensed by the GPS sensor.

8. The lace adjuster assembly of claim 2 wherein the sensor assembly further includes an input mechanism that is electrically connected to the controller, the input mechanism being usable by the user to input a weight of the user; and wherein the controller generates the first statistical data point based at least in part on the first performance characteristic and the weight of the user.

9. The lace adjuster assembly of claim 8 wherein the first statistical data point is one of an energy expended and a force expended by the user during the athletic performance.

10. The lace adjuster assembly of claim 2 wherein the sensor assembly further includes a transmitter that is positioned within the body assembly, the transmitter being configured to wirelessly transmit the first statistical data point to a remote device.

11. The lace adjuster assembly of claim 1 wherein the first sensor senses one or more of a horizontal movement, a vertical movement and an angular movement of the user during the athletic performance.

12. The lace adjuster assembly of claim 1 wherein the first sensor includes one of a two-axis accelerometer, a three-axis accelerometer and a rate sensor.

13. The lace adjuster assembly of claim 1 wherein the first sensor includes a magnetometer that measures a magnitude and direction of magnetic fields at a point in space in relation to a position of the user during the athletic performance.

14. The lace adjuster assembly of claim 1 further comprising an image capturing assembly that is mechanically coupled to the lace adjuster, the image capturing assembly being configured to selectively capture an image of the user during the athletic performance.

15. The lace adjuster assembly of claim 1 wherein the first sensor senses an angular movement of the user during the athletic performance.

16. A lace adjuster assembly that is adapted to selectively adjust and secure a shoelace of a shoe of a user, the lace adjuster assembly comprising:
a lace adjuster that is adapted to allow the user to selectively adjust the shoelace of the shoe of the user, the lace adjuster including a body assembly having a first body member and a second body member that is movably coupled to the first body member, the lace adjuster being selectively movable between an unlocked configuration and a locked configuration, wherein the shoelace is adjustable relative to the lace adjuster when the lace adjuster is in the unlocked configuration, and wherein the shoelace is resiliently retained by the lace adjuster and is inhibited from being adjusted relative to the lace adjuster when the lace adjuster is in the locked configuration; and
a sensor assembly that is mechanically coupled to the lace adjuster, the sensor assembly including (i) a first sensor that is configured to sense a first performance characteristic of the user during an athletic performance, (ii) a storage device that is configured to store the first performance characteristic sensed by the first sensor, and (iii) a transmitter that is configured to wirelessly transmit the first performance characteristic that is stored within the storage device to a remote device;
wherein the first sensor, the storage device and the transmitter are positioned within the body assembly.

17. The lace adjuster assembly of claim 16 wherein the sensor assembly further includes a controller that is electrically connected to the first sensor, the controller including a processor; and wherein the controller receives the first performance characteristic from the first sensor and generates a first statistical data point based at least in part on the first performance characteristic.

18. The lace adjuster assembly of claim 17 wherein the sensor assembly further includes a second sensor that is positioned within the body assembly of the lace adjuster, the second sensor sensing a second performance characteristic of the user during the athletic performance; wherein the storage device is configured to store the second performance characteristic sensed by the second sensor; and wherein the controller further receives the second performance characteristic from the second sensor and generates the first statistical data point based at least in part on the first performance characteristic and the second performance characteristic.

19. The lace adjuster assembly of claim 17 wherein the sensor assembly further includes a second sensor that is positioned within the body assembly of the lace adjuster, the second sensor sensing a second performance characteristic of the user during the athletic performance; wherein the storage device is configured to store the second performance characteristic sensed by the second sensor; and wherein the controller further receives the second performance characteristic from the second sensor and generates a second statistical data point based at least in part on the second performance characteristic.

20. The lace adjuster assembly of claim 16 further comprising an image capturing assembly that is mechanically coupled to the lace adjuster, the image capturing assembly being configured to selectively capture an image of the user during the athletic performance.

* * * * *